US010271298B1

(12) United States Patent
Yang et al.

(10) Patent No.: US 10,271,298 B1
(45) Date of Patent: Apr. 23, 2019

(54) RESTORING SERVICE TO A MOBILE DEVICE ON A HOME NETWORK

(71) Applicant: Futurewei Technologies, Inc., Plano, TX (US)

(72) Inventors: Tongzeng Yang, San Diego, CA (US); Julia Wang, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 16/022,012

(22) Filed: Jun. 28, 2018

(51) Int. Cl.
| H04W 4/00 | (2018.01) |
| H04W 60/04 | (2009.01) |
| H04W 48/02 | (2009.01) |
| H04W 48/10 | (2009.01) |
| H04W 48/16 | (2009.01) |
| H04W 60/06 | (2009.01) |
| H04W 84/04 | (2009.01) |

(52) U.S. Cl.
CPC ........... *H04W 60/04* (2013.01); *H04W 48/02* (2013.01); *H04W 48/10* (2013.01); *H04W 48/16* (2013.01); *H04W 60/06* (2013.01); *H04W 84/042* (2013.01)

(58) Field of Classification Search
CPC ..... H04W 60/04; H04W 60/06; H04W 48/16; H04W 48/02; H04W 48/10; H04W 84/042
See application file for complete search history.

(56) References Cited

U.S. PATENT DOCUMENTS

| 6,826,414 | B1 * | 11/2004 | Reynolds | .............. | H04W 48/02 |
| | | | | | 455/432.1 |
| 2009/0298459 | A1 * | 12/2009 | Saini | ..................... | H04W 48/20 |
| | | | | | 455/404.1 |
| 2015/0094058 | A1 * | 4/2015 | Dang | .................. | H04W 84/042 |
| | | | | | 455/434 |

OTHER PUBLICATIONS

3GPP TS 24.008 v9.3.0; 3rd Generation Partnership Project; Technical Specification Group Core Network and Terminals; Mobile radio interface Layer 3 specification; Core network protocols; Stage 3 (Release 9), Jun. 2010; 611 pages.
3GPP TS 24.301 v12.6.0; 3rd Generation Partnership Project; Technical Specification Group Core Network and Terminals; Non-Access-Stratum (NAS) protocol for Evolved Packet System (EPS); Stage 3 (Release 12); Sep. 2014, 370 pages.

* cited by examiner

*Primary Examiner* — Amancio Gonzalez
(74) *Attorney, Agent, or Firm* — Slater Matsil, LLP

(57) ABSTRACT

In certain embodiments, a method includes initiating, by a mobile device, an attempt to connect to a visiting network and receiving, by the mobile device in response to the attempt to connect to the visiting network, a rejection from the visiting network. The method includes initiating, by the mobile device in response to the rejection from the visiting network, a limited-services timer to initiate a limited-services state for the mobile device. The mobile device is subscribed to a service on a home network of the mobile device and is prevented in the limited-services state from attempting to access the service. The method further includes detecting, by the mobile device prior to expiration of the limited-services timer, availability of the home network and permitting, by the mobile device prior to expiration of the limited-service timer, the mobile device to attempt to connect to the home network for accessing the service.

25 Claims, 9 Drawing Sheets

RESTORING SERVICE TO A MOBILE DEVICE ON A HOME NETWORK

TECHNICAL FIELD

The present disclosure relates generally to wireless communications, and, in particular embodiments, to restoring service to a mobile device on a home network.

BACKGROUND

Mobile devices offer a variety of conveniences to users of the mobile devices, including the ability to move from one location to another location while still making use of the mobile devices, including communication capabilities of the mobile devices. Typically, a user of a mobile device subscribes to particular services, including communication services (e.g., voice and/or data services) from a particular service provider. As the user of the mobile device moves with the mobile device from one location to another, the user may move from a home network of the mobile device to a visiting network of the mobile device, a process often referred to as roaming. As the user moves from one network to another, the user may be entitled to less or even no services in a new network.

SUMMARY

In certain embodiments, a mobile device includes one or more processors and a non-transitory computer-readable medium storing instructions. The instructions are configured to, when executed by the one or more processors, cause the one or more processors to perform operations that include initiating an attempt to connect to a visiting network and receiving, in response to the attempt to connect to the visiting network, a rejection from the visiting network. The operations further include initiating, in response to the rejection from the visiting network, a limited-services timer to initiate a limited-services state for the mobile device. The mobile device is subscribed to a service on a home network of the mobile device, and the mobile device is prevented in the limited-services state from attempting to access the service. The operations further include detecting, prior to expiration of the limited-services timer, availability of the home network of the mobile device and permitting, prior to expiration of the limited-service timer, the mobile device to attempt to connect to the home network for accessing the service.

In certain embodiments, a method includes initiating, by a mobile device, an attempt to connect to a visiting network and receiving, by the mobile device in response to the attempt to connect to the visiting network, a rejection from the visiting network. The method includes initiating, by the mobile device in response to the rejection from the visiting network, a limited-services timer to initiate a limited-services state for the mobile device. The mobile device is subscribed to a service on a home network of the mobile device and is prevented in the limited-services state from attempting to access the service. The method further includes detecting, by the mobile device prior to expiration of the limited-services timer, availability of the home network and permitting, by the mobile device prior to expiration of the limited-service timer, the mobile device to attempt to connect to the home network for accessing the service.

In certain embodiments, a non-transitory computer-readable medium stores instructions, and the instructions are configured to, when executed by one or more processors, cause the one or more processors to perform operations that include initiating, by a mobile device, an attempt to connect to a visiting network. The attempt to connect to the visiting network includes one or more of a registration request, a routing area update (RAU), a location area update (LAU), and a tracking area update (TAU). The operations further include receiving, by the mobile device in response to the attempt to connect to the visiting network, a rejection from the visiting network. The rejection is one or more of an illegal user equipment (UE) evolved packet system (EPS) mobility management (EMM) message and an international mobile subscriber identity (IMSI) unknown in home subscriber server (HSS) EMM message. The operations further include initiating, by the mobile device in response to the rejection from the visiting network, a limited-services timer to initiate a limited-services state for the mobile device. The mobile device is subscribed to a service on a home network of the mobile device, and the mobile device is prevented in the limited-services state from attempting to access the service both on the home network and the visiting network. The operations further include detecting, by the mobile device prior to expiration of the limited-services timer and without the mobile device being power-cycled after initiation of the limited-services timer, availability of the home network of the mobile device. The operations further include permitting, by the mobile device prior to expiration of the limited-service timer and without the mobile device being power-cycled after initiation of the limited-services timer, the mobile device to attempt to connect to the home network for accessing the service.

Embodiments of the present disclosure may provide one or more technical advantages. Embodiments of the present disclosure improve the user experience of a mobile device user by allowing the user's mobile device to return to service with increased speed and efficiency when the mobile device returns to the home network for the mobile device, without waiting for the limited-service timer to expire and without a power cycling of the mobile device. Allowing the user's mobile device to return to service on the home network prior to expiration of the limited-services timer and without a power cycling of the device may save power consumption resources and associated battery charge of the mobile device. Certain embodiments of the present disclosure preserve processing and network resources for a mobile device and elements of a visiting network by adding a visiting network that rejected the mobile device to a block list for the duration of a block-timer, such that the mobile device does not attempt to connect to the visiting network while the visiting network is on the block list.

Certain embodiments of the present disclosure may provide some, all, or none of the above advantages. Certain embodiments may provide one or more other technical advantages, one or more of which may be readily apparent to those skilled in the art from the figures, descriptions, and claims included in this disclosure.

BRIEF DESCRIPTION OF THE DRAWINGS

For a more complete understanding of the present disclosure and its advantages, reference is now made to the following descriptions taken in conjunction with the accompanying drawings, in which.

DETAILED DESCRIPTION OF ILLUSTRATIVE EMBODIMENTS

Figure 1A:
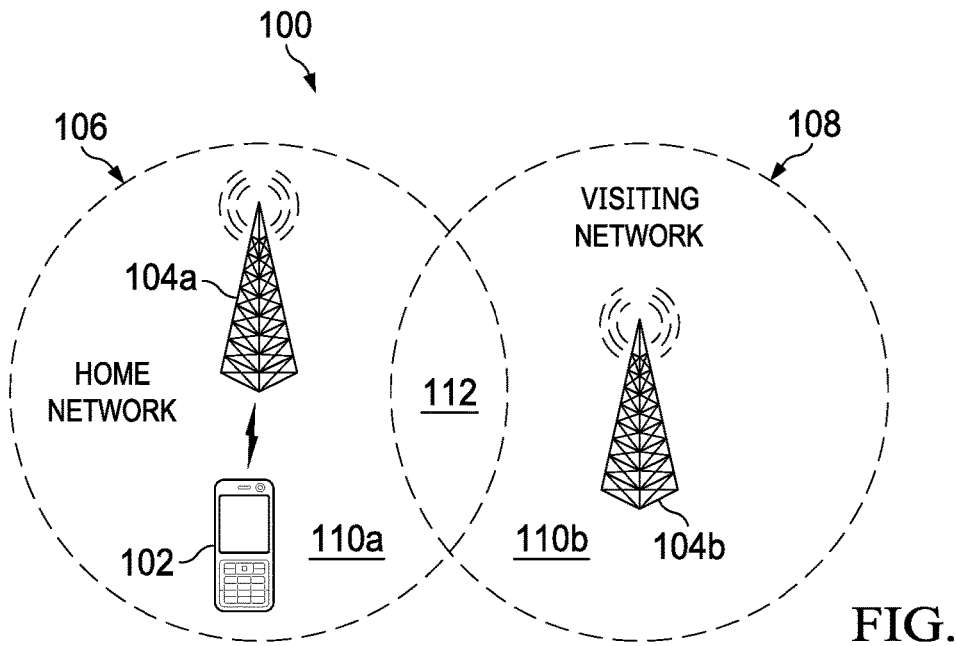
FIGS. 1A-1C illustrate an example system in which a mobile device moves from a home network to a visiting network and back to the home network, according to certain embodiments of the present disclosure.

As described above, a user of a mobile device may be subscribed to certain services (e.g., voice services and/or data services) on a home network of the mobile device. When the user of the mobile device moves with the mobile device such that the mobile device attempts to join a visiting network, often referred to as roaming, the user may be able to access fewer services or even no services on the visiting network. In some scenarios, the visiting network may even reject the attempt by the mobile device to connect to the visiting network.

According to certain telecommunication standards and depending on the reasons for the rejection, receiving a rejection from a visiting network may cause the mobile device to start a timer (a limited-services timer), the duration of which the mobile device is in a limited-services state. In this limited-services state, the mobile device may not be able to access all of the services to which the mobile device is subscribed, even when the home network of the mobile device is again accessible to the mobile device. For example, in the limited-services state (e.g., during the duration of the limited-services timer), the mobile device may be prevented from attempting to connect to both the visited network and the home network of the mobile device, and thereby prevented from accessing most if not all services to which the mobile device is subscribed.

In general, regardless of whether the mobile device has left the visiting network and returned to the home network for the mobile device, the mobile device is kept in this limited-services state until either the limited-services timer expires (a timer for which, in certain embodiments, the starting value is uniformly drawn from the range of twelve hours and twenty-four hours), or the mobile device is powered down and restarted (e.g., power cycled), which may reset the limited-services timer.

The inability to easily return to full service on the home network for a user's mobile device, without powering down and restarting the mobile device or waiting for the timer to expire, reduces the user experience of the mobile device user and results in inefficient operation of the mobile device. As just one example, if a user has been travelling and the user's mobile device has experienced a visiting network rejection that caused the mobile device to enter this limited-services state, the user's mobile device may still be in this limited-services state when the user returns to the user's home country (e.g., when the user's airplane lands back in the user's home country). Eager to make a call to notify a waiting driver of the user's arrival or to make other plans, the user may be frustrated by the inability to make a call or otherwise access services even though the home network of the user's mobile device is accessible to the mobile device. As this example illustrates, this type of unnecessarily extended limited-services state—a state that persists even though the home network of the user's mobile device is accessible to the mobile device—may lead to unpleasant user experiences and inefficient operation of the mobile device. Furthermore, while the user may power cycle the mobile device to reset the limited-services timer, this again leads to a frustrating user experience and inefficient use of mobile device resources, as powering down and restarting the mobile device is inconvenient for the user of the mobile device and likely increases the power consumption and associated battery drain of the mobile device.

Embodiments of the present disclosure improve the user experience of a mobile device user by allowing the user's mobile device to return to service with increased speed and efficiency when the mobile device returns to the home network for the mobile device, without waiting for the limited-service timer to expire and without a power cycling of the mobile device. Allowing the user's mobile device to return to service on the home network prior to expiration of the limited-services timer and without a power cycling of the device may save power consumption resources and associated battery charge of the mobile device.

In certain embodiments, a method includes initiating, by a mobile device, an attempt to connect to a visiting network and receiving, by the mobile device in response to the attempt to connect to the visiting network, a rejection from the visiting network. The method includes initiating, by the mobile device in response to the rejection from the visiting network, a limited-services timer to initiate a limited-services state for the mobile device. The mobile device is subscribed to a service on a home network of the mobile device and is prevented in the limited-services state from attempting to access the service. The method further includes detecting, by the mobile device prior to expiration of the limited-services timer, availability of the home network and permitting, by the mobile device prior to expiration of the limited-service timer, the mobile device to attempt to connect to the home network for accessing the service.

Figure 1B:
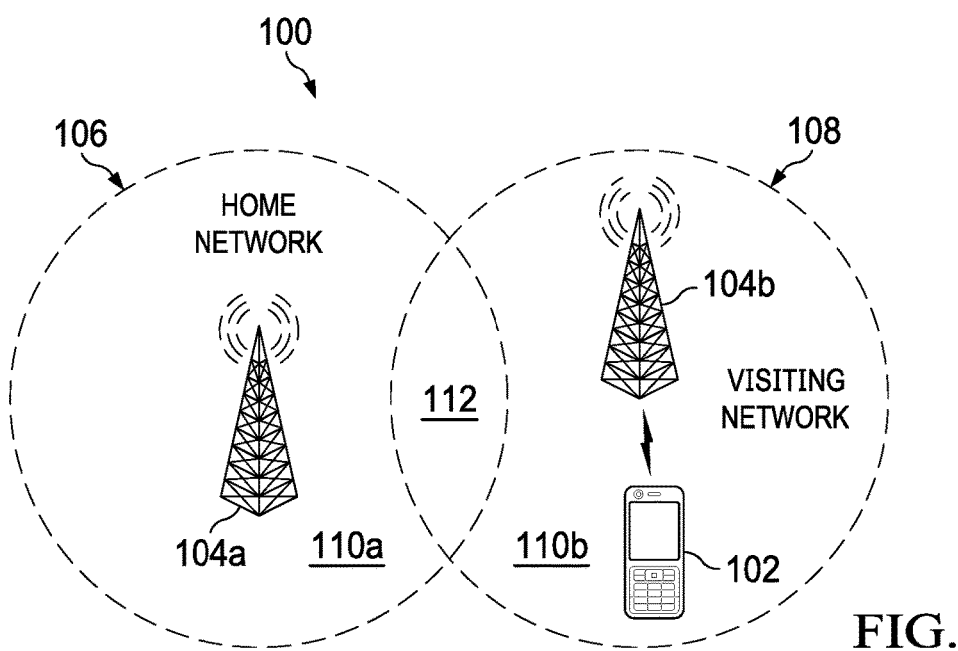
Figure 1C:
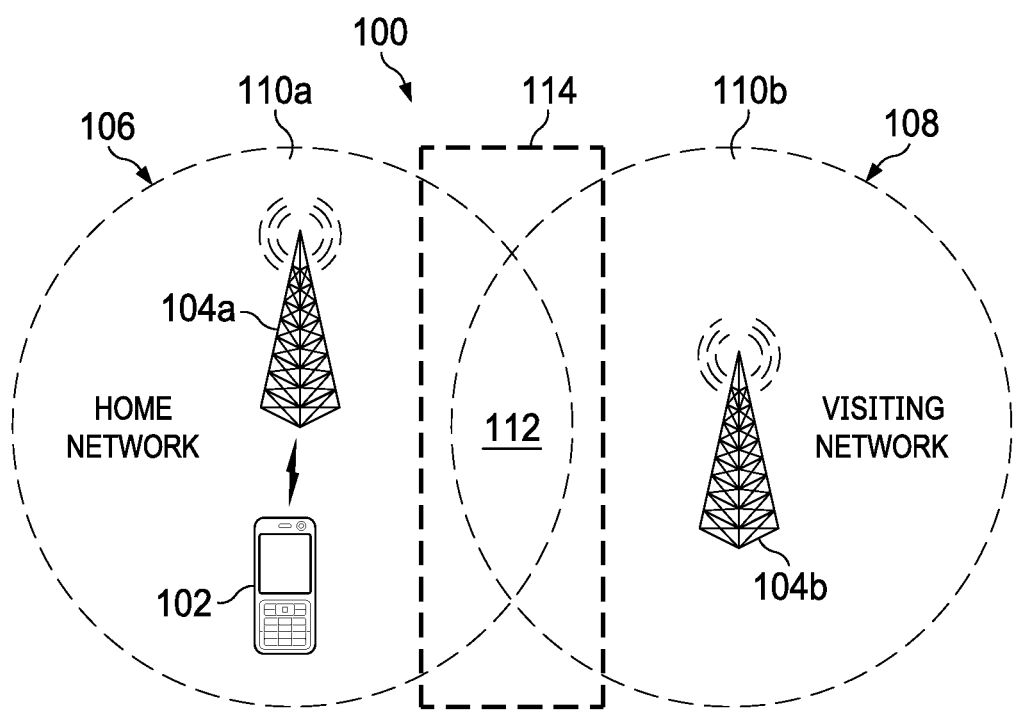

FIGS. 1A-1C illustrate an example system 100 in which a mobile device moves from a home network to a visiting network and back to the home network, according to certain embodiments of the present disclosure. In the illustrated example, system 100 includes mobile device 102, one or more communications controllers 104, home network 106, and visiting network 108. Although system 100 is illustrated and described as including particular components, this disclosure contemplates system 100 including fewer, additional, and other components, if appropriate.

Mobile device 102 may include any processing device that is configured to operate and/or communicate in system 100, such as any processing device that is configured to transmit and/or receive wireless signals. For example, mobile device 102 may include any processing device capable of wirelessly communicating with communications controllers 104, described below. For example, mobile device 102 represents any suitable end user device and may include such devices (or may be referred to) as a user equipment/device (UE), wireless device, wireless transmit/receive unit (WTRU), mobile station, fixed or mobile subscriber unit, pager, cellular telephone, personal digital assistant (PDA), smartphone, laptop, computer, touchpad, wireless sensor, or consumer electronics device. Although described as being mobile, this disclosure contemplates mobile device 102 being any processing device that could at some point be connected to a home network for the mobile device 102 and at another point be connected to a visiting network of the mobile device 102.

System 100 also includes communications controllers 104a and 104b. A communications controller 104 may be any component capable of providing wireless access by establishing uplink and/or downlink connections with other components of system 100, such as other components of or otherwise made available through home network 106 and/or visiting network 108, described below. For example, a communications controller 104 may be configured to wirelessly interface with mobile device 102 to provide access to a core network, a public switched telephone network (PSTN), the Internet, and/or other communication equipment or other processing devices. In certain embodiments, a communications controller 104 may be or include a base station, a NodeB, an enhanced NodeB (eNB), an access point, a picocell, a femtocell, a relay node, and other wireless devices. Although a particular number of communications controllers are illustrated and primarily described, this disclosure contemplates system 100 including any suitable number of communications controllers 104.

This disclosure contemplates system 100 using multiple channel access functionality. In certain embodiments, mobile device 102 and communications controllers 104 are configured to implement the Long Term Evolution wireless communication standard (LTE), LTE Advanced (LTE-A), and/or LTE Broadcast (LTE-B). Mobile device 102 and communications controllers 104 may be configured to implement unlicensed LTE (or U-LTE). Mobile device 102 and communications controllers 104 may be configured to implement Wi-Fi. Additionally or alternatively, mobile device 102 and communications controllers 104 may be configured to implement UMTS, HSPA, or HSPA+ standards and protocols. This disclosure contemplates a mix of any of these schemes and wireless protocols being implemented by system 100. Of course, other multiple access schemes and wireless protocols may be used, whether or not in combination with the above schemes and wireless protocols.

In the illustrated example, communications controller 104a provides mobile device 102 with access to a home network 106 of mobile device 102. In certain embodiments, a home network of a mobile device 102 is a communication network to which the mobile device 102 (and/or a user of mobile device 102) is subscribed for the provision of one or more services, such as one or more voice services, one or more data services, and any other suitable services that may be provided by a communications network. In certain embodiments, home network 106 is a Home Public Land Mobile Network (HPLMN) for a particular subscriber (e.g., the user of mobile device 102), which is the Public Land Mobile Network (PLMN) that stores the subscriber profile for the particular subscriber. Although a single communications controller 104a is illustrated as providing home network 106, this disclosure contemplates any suitable number of communications controllers 104 providing home network 106 such that mobile devices (such as mobile device 102) may detect (and connect to, if appropriate) home network 106 at a variety of locations.

In the illustrated example, communications controller 104b establishes a visiting network 108, or at least what is a visiting network to mobile device 102. In certain embodiments, visiting network 108 represents any network with which mobile device 102 is not registered for service. Depending on a variety of factors, such as the subscription plan associated with mobile device 102, agreements between or among service providers, the technology underlying home network 106 and visiting network 108, mobile device 102 may have access to the same services on visiting network 108 that are available to mobile device 102 on home network 106, sometimes for an additional fee. Alternatively, mobile device 102 may have access to fewer than or none of the services on visiting network 108 that are available to mobile device 102 on home network 106. In certain embodiments, visiting network 108 is a Visiting Public Land Mobile Network (VPLMN), which can be any network to which the particular subscriber roams from the subscriber's HPLMN. Although a single communications controller 104b is illustrated as providing visiting network 108, this disclosure contemplates any suitable number of communications controllers 104 providing visiting network 108 such that mobile devices (such as mobile device 102) may detect (and connect to, if appropriate) visiting network 108 at a variety of locations.

In some scenarios, one or more of the following may be true of visiting network 108: visiting network 108 may be operated by a different service provider than the service provider that operates home network 106; visiting network 108 may use a different technology than the technology used by home network 106; and visiting network 108 may be located in a different geographical region (e.g., a different country) than the geographical region of home network 106.

Communications controller 104a has a coverage area 110a in which home network 106 is accessible to mobile device 102, and communications controller 104b has a coverage area 110b in which mobile device 102 is able to detect visiting network 108. In the illustrated example, communication area 110a of home network 106 and communication area 110b of visiting network 108 overlap in area 112. Although shown as overlapping in area 112, coverage area 110a of home network 106 and coverage area 110b of visiting network 108 may or may not overlap. For example, coverage area 110a of home network 106 and coverage area 110b of visiting network 108 may overlap, such as is shown at area 112 in FIGS. 1A-1C. As another example, coverage area 110a of home network 106 and coverage area 110b of visiting network 108 may not overlap but may be directly adjacent to one another, such that little to no gap exists between the respective coverage areas of home network 106 and visiting network 108. As another example, coverage area 110a of home network 106 and coverage area 110b of visiting network 108 may not overlap and may be completely remote from one another, such that a substantial gap exists between the respective coverage areas of home network 106 and visiting network 108.

FIG. 1A illustrates an example in which mobile device 102 is connected at a first time to home network 106 via communications controller 104a. The first time may be a first instant in time or a first time period having a starting time and a subsequent different ending time. When connected to home network 106, mobile device 102 may have access to one or more of the services to which a user of mobile device 102 is subscribed. For example, when connected to home network 106, mobile device 102 may have access to all of the services to which a user of mobile device 102 is subscribed.

FIG. 1B illustrates an example in which mobile device 102 has moved at a second time out of the coverage area 110a of home network 106, such that mobile device 102 is no longer connected to home network 106, and is now within coverage area 110b of visiting network 108. The second time may be a second instant in time or a second time period having a starting time and a subsequent different ending time. Having lost the connection to home network 106 and detecting visiting network 108 (e.g., via a signal communicated by communications controller 104b), mobile device 102 may attempt to connect to visiting network 108 (e.g., via communications controller 104b).

Mobile device 102 may attempt to connect to visiting network 108 in any suitable manner. For example, mobile device 102 may transmit one or more of a registration request, a routing area update (RAU), a location area update (LAU), and a tracking area update (TAU) to a suitable element of visiting network 108, such as to communications controller 104b of visiting network 108. In certain embodiments, mobile device 102 may transmit any of these requests and/or updates whether in an idle or active state. Furthermore, in certain embodiments, mobile device 102 may attempt to connect to visiting network (e.g., by transmitting one or more of a registration request, an RAU, an LAU, and a TAU to a suitable element of visiting network 108) in response to mobile device 102 detecting a signal broadcast or otherwise transmitted by visiting network 108 (e.g., a signal broadcast by communications controller 104b).

A registration request may include an attach registration request by which mobile device 102 attempts to connect to visiting network 108 via communications controller 104b.

In response to the registration request communicated by mobile device 102, communications controller 104b or another suitable component of visiting network 108 may request an RAU, an LAU, and/or a TAU from mobile device 102. Alternatively, mobile device may transmit the RAU, LAU, and/or TAU with or without a registration request. Whether mobile device 102 uses an RAU, and LAU, or a TAU may depend on the particular access technology (e.g., 2G/3G/4G, etc.). In general, the term RAU is used in the packet-switched context when referring to General Packet Radio Service (GPRS) systems, which is a packet oriented mobile data service on the 2G and 3G cellular communication system's global system for mobile communications (GSM); the term LAU is used in the circuit switched context when referring to a mobile switching center (MSC) for the 2G and 3G GSM; and the term TAU is used in the context of the evolved packet core (EPC) mobility management entity (MME) for the LTE system architecture evolution (SAE). This disclosure, however contemplates using the terms RAU, LAU, and TAU interchangeably with any suitable network communication technology.

Taking the RAU first, the routing area is the packet-switched domain equivalent of the location area (described below). A routing area is normally a subdivision of a location area. Routing areas are used by mobile devices (e.g., mobile device 102) that are attached to a GPRS system. GPRS may be optimized for so-called bursty data communication services, such as wireless internet/intranet and multimedia services.

Taking the LAU second, the LAU procedure allows a mobile device (e.g., mobile device 102) to inform the cellular network, when the mobile device moves from one location area to another (e.g., from a location associated with home network 106 to a location associated with visiting network 108). In certain embodiments, mobile device 102 detects location area codes, and when mobile device 102 determines that the location area code is different from its last update, mobile device 102 performs another update by sending to the network one or more of the detected location area code, a location update request, the previous location, and a Temporary Mobile Subscriber Identity (TMSI) of the mobile device 102.

Taking the TAU third, the tracking area update is in some ways similar to the RAU and LAU in that it is the mechanism by which mobile devices (e.g., mobile device 102) update their location in LTE networks. The tracking area may include the geographical location of one or more communications controllers 104 (e.g., eNBs). A mobile device 102 may initiate a TAU for a variety of reasons, including that mobile device 102 has moved to a new tracking area that is not included in the list of tracking areas with which mobile device 102 is registered (e.g., which might occur when mobile device 102 moves from a tracking area associated with home network 106 to a tracking area associated with visiting network 108), when mobile device 102 moves from a network associated with a first communication technology (e.g., LTE) to a communication network associated with a second communication technology (e.g., UMTS), when mobile device moves from an EPS services-capable network to a non-EPS services-capable network, or for a variety of other reasons.

Although this disclosure describes particular techniques for mobile device 102 providing a location update to visiting network 108, this disclosure contemplates mobile device 102 providing an updated location to visiting network 108 in any suitable manner. Additionally, although this disclosure describes particular techniques for mobile device 102 attempting to connect to visiting network 108, this disclosure contemplates mobile device 102 attempting to connect to visiting network 108 in any suitable manner.

In some scenarios, in response to a request by mobile device 102 to connect to visiting network 108, communications controller 104b may communicate a rejection of the request to connect to visiting network 108. An underlying cause for these rejections could be that roaming or international roaming is disabled for the mobile device 102. This setting could be a part of the subscription plan for mobile device 102 or could be configured by the user in the settings of mobile device 102.

Communications controller 104b, may reject the request of mobile device 102 to connect to visiting network 108 for a variety of reasons. For example, communications controller 104b may determine that mobile device 102 is an illegal UE (with respect to visiting network 108) and communicates an illegal UE evolved packet system (EPS) mobility management (EMM) message to mobile device 102. As another example, communications controller 104b may determine that the international mobile subscriber identity (IMSI) of mobile device 102 is unknown in the home subscriber server (HSS) of visiting network 108 and communicates an IMSI unknown in HSS EMM message to mobile device 102. Although this disclosure describes particular reasons for the rejections of mobile device 102 by visiting network 108, this disclosure contemplates visiting network rejecting mobile device 102 for any suitable reason. Although this disclosure describes communications controller 104b as determining the rejection and communicating the rejection to mobile device 102, this disclosure contemplates any suitable component of system 100, including any suitable component of visiting network 108, communicating the rejection to mobile device 102.

As described above, in certain embodiments, rejections communicated by visiting network 108 (e.g., by communications controller 104b) are EMM messages, such as EMM error codes. For example, the rejection may be "IMSI unknown in HSS," which may be assigned cause number 2 as the error code. This EMM cause may be transmitted to mobile device 102 if mobile device 102 is not known (e.g., not registered) in the HSS of visiting network 108 or if mobile device 102 has a packet only subscription. In certain embodiments, the "IMSI unknown in HSS" EMM cause does not affect operation of the EPS service. As another example, the rejection may be "illegal UE," which may be assigned cause number 3 as the error code. This EMM cause may be transmitted to mobile device 102 when visiting network 108 refuses service to mobile device 102 either because an identity of mobile device 102 is not acceptable to visiting network 108 or because mobile device 102 does not pass an authentication check (e.g., the authentication response (RES) received from mobile device 102 is different from that generated by visiting network 108).

According to certain telecommunications standards, in response to receiving a rejection from communications controller 104b of visiting network 108, mobile device 102 initiates a limited-services timer to initiate a limited-services state for mobile device 102. For example, the $3^{rd}$ Generation Partnership Project (3GPP) Technical Specification (TS) 24.301 describes examples of the "illegal UE" rejection cause and the "IMSI unknown in HSS" rejection cause and associated actions in response to those causes. As a particular example, Section 5.5.1.2.5 of 3GPP TS 24.301 describes the "illegal UE" rejection cause as "Attach not accepted by the network." As another particular example, Section 5.50.1.3.4.3 describes the "IMSI unknown in HSS" rejection cause as "Combined attach successful for EPS services only." The limited-services timer may have any suitable duration. In certain embodiments, as specified in 3GPP TS 24.008 for a timer referred to as T3245 for example, at each initiation of the limited-services timer, mobile device 102 randomly selects the duration of the limited-services timer from a range of twelve to twenty-four hours.

Although described as being specified in a telecommunications standard, and in a particular telecommunication standard, this disclosure contemplates limited-services timer being initiated according to this telecommunications standard, according to a different telecommunications standard than the example described, or not according to a standard, as may be appropriate for a particular implementation. Although this duration and manner of selection for the limited-services timer are described, this disclosure contemplates the limited-services timer having any suitable duration and that duration being selected in any suitable manner. Furthermore, this disclosure contemplates a network element other than mobile device 102 selecting the duration of the limited-service timer.

When connected to home network 106, mobile device 102 may have access to one or more of services to which a user of mobile device 102 is subscribed. For example, when connected to home network 106, mobile device 102 may have access to all of the services to which a user of mobile device 102 is subscribed. These services may include one or more voice services, one or more data services, and any other suitable services that may be provided by a communications network. Among other services and according to certain regulations of particular jurisdictions, mobile device 102 also may have access to one or more emergency services, such as the ability to make 911 emergency calls (or the applicable emergency number for the relevant geographical location of mobile device 102).

In certain embodiments, a limited-service state of mobile device 102 is a state in which mobile device 102 is prevented from attempting to access one or more of the services that otherwise would be accessible to mobile device 102 on home network 106 of mobile device 102. In certain embodiments, and again according to certain regulations of particular jurisdictions, mobile device 102 may retain the ability to make emergency calls in the limited-services state. In certain embodiments, in the limited-services state, mobile device 102 is prevented from attempting to access any services other than emergency services (e.g., the ability to make emergency calls).

The particular limitations on the UE during the limited service state could depend on any suitable combination of the capabilities of the UE, the parameters of the subscription plan associated with the UE, and the reason for the rejection. For example, the particular services that mobile device 102 is prevented from attempting to access in the limited-services state is based on the reason for the rejection mobile device 102 received from visiting network 108.

For example, in certain embodiments, when the cause associated with the rejection is IMSI unknown in HSS, mobile device 102 may be prevented from attempting to access 3G services but mobile device 102 may still be able to use LTE service, if available (e.g., if mobile device 102 supports LTE communications and mobile device 102 is in an area that has LTE coverage). In this example, if mobile device 102 does not support voice over LTE or is in an area that does not have LTE coverage, mobile device 102 may be unable to make a voice call, other than perhaps an emergency call.

As another example, in certain embodiments, when the cause associated with the rejection is illegal UE, mobile device 102 may be prevented from attempting to make voice calls other than emergency calls.

Although particular limitations on services are described with respect to the particular reasons for the rejection of mobile device 102 by visiting network 108, the present disclosure contemplates any suitable limitations on services associated with any suitable reason for the rejection of mobile device 102 by visiting network 108. Additionally, in general, even in the limited-service state, mobile device 102 retains the ability to search for available networks (e.g., communications controllers 104) and detect certain information about detected networks.

During the limited-services state, mobile device 102 may be prevented from accessing the one or more services both on visiting network 108 and on home network 106. This can create inefficiencies in the operation of mobile device 102 and an unpleasant experience for a user of mobile device 102. For example, even when mobile device 102 returns to home network 106 of mobile device 102, mobile device 102 remains unable to access services that should be available to mobile device 102 (and its associated user). While powering down and restarting mobile device 102 may reset the limited-services timer and restore services to mobile device 102, powering down and restarting mobile device 102 is inconvenient for a user of mobile device 102 and likely increases the power consumption and associated battery drain of mobile device 102.

FIG. 1C illustrates an example in which mobile device 102 has moved at a third time back to coverage area 110a of home network 106, such that mobile device 102 is able to detect home network 106 (e.g., detect a signal transmitted by communications controller 104a). The third time may be a third instant in time or a third time period having a starting time and a subsequent different ending time. Additionally, although FIG. 1C shows communications controller 104a as providing home network 106, the communications controller 104 that provides home network 106 (that is detected by mobile device 102 in FIG. 1C) may be the same as or different than the communications controller to which mobile device 102 was connected in FIG. 1A.

Mobile device 102 may detect accessibility of home network 106. In certain embodiments, mobile device 102 can detect accessibility of home network 106 whether mobile device 102 is in active mode or idle mode. Mobile device 102 may detect accessibility of home network 106 in a variety of ways.

As a first example, communications controller 104a (e.g., an eNB) may transmit information that is obtained by mobile device 102 to detect home network 106. As a particular example, communications controller 104a (e.g., an eNB) may periodically (e.g., every 80 ms or at another suitable interval) broadcast or otherwise transmit a SystemInformationBlockType1 message. Mobile device 102 may detect this SystemInformationBlockType1 message and obtain PLMN information from the SystemInformationBlockType1 message.

In certain embodiments, a SystemInformationBlockType1 message includes information that is relevant to evaluating whether a mobile device 102 (e.g., a UE) is allowed to access a cell (e.g., home network 106, as provided by communications controller 104a) and defines the scheduling of other system information. In certain embodiments, the SystemInformationBlockType1 message includes PLMN-IdentityList (e.g., a list of PLMN identities). For example, the PLMN identities may include codes associated with service providers associated with the service made available through that cell (e.g., home network 106, as provided by communications controller 104a). Mobile device 102 may know the identity of the home network (e.g., home network 106) of mobile device 102. For example, mobile device 102 may know the identity of the HPLMN of mobile device 102. Mobile device 102 may determine that home network 106 is accessible to mobile device 102 by comparing the PLMN contained in the SystemInformationBlockType1 message with the HPLMN known to mobile device 102.

As a second example, mobile device 102 may determine that home network 106 is accessible to mobile device 102 using global positioning system (GPS) information. For example, mobile device 102 may store information indicating GPS coordinates at which home network 106 is accessible to mobile device 102. Mobile device 102 may be configured to determine whether a detected network is a home network of mobile device 102 based on the stored information indicating the GPS coordinates.

Although this disclosure describes particular techniques for determining that home network 106 is accessible to mobile device 102, it should be understood that this disclosure contemplates using any suitable technique for determining that home network 106 is accessible to mobile device 102.

In certain embodiments, mobile device 102 may detect home network 106 prior to expiration of the limited-services timer, which was started in response to mobile device 102 receiving a rejection from visiting network 108 (e.g., as described above with reference to FIG. 1B). Rather than waiting for the limited-services timer to expire or for the user of mobile device 102 to power down and restart mobile device 102, embodiments of the present disclosure allow one or more services of mobile device 102 to be restored prior to expiration of the limited-services timer or a powering down and restarting of mobile device 102. For example, embodiments of the present disclosure Thus, prior to expiration of the limited-services timer and in response to detecting availability of home network 106 of mobile device 102, mobile device 102 may permit attempts to connect to home network 106 to access services to which mobile device 102 is subscribed. Such services may include services that mobile device 102 was prevented from accessing in the limited service state, even on home network 106 of mobile device 102. In certain embodiments, to restore the ability to attempt to connect to home network 106 to access those services, mobile device may be configured to ignore the limited service timer (and allow the limited service timer to expire in the background) or to reset the limited-services timer such that the limited service timer no longer is running and/or is reset to zero.

In certain embodiments, mobile device 102 implements a block list for visiting networks that rejected mobile device 102. For example, mobile device 102 may add visiting network 108 to a block list for a blocked time. Mobile device 102 may forego attempting to connect to networks that are included on the block list for the blocked time. Because, in response to mobile device 102 detecting availability of home network 106 and determining that limited-services timer has not expired, mobile device 102 may ignore or reset the limited-services timer, it is possible that mobile device 102 may again detect visiting network 108 and attempt to connect to visiting network 108. This may be particularly possible when coverage area 110a of home network 106 and coverage area 110b of visiting network 108 overlap or are otherwise in relatively close proximity to one another. As a particular example, this may be particularly possible when a mobile device 102 moves around in area 114 shown in FIG. 1C.

These repeated attempts by mobile device 102 to access visiting network 108 could result in a waste of processing and network resources for both mobile device 102 and elements of visiting network 108. Visiting network 108 likely would again reject mobile device 102 for the same reasons, and both visiting network 108 and mobile device 102 would have to waste processing and network resources to again determine that mobile device 102 is rejected. In certain embodiments, adding a visiting network 108 that rejected mobile device 102 to a block list for a blocked time may reduce or eliminate instances of mobile device 102 repeatedly attempting to access visiting network 108, which may save processing and/or network resources of mobile device 102 and visiting network 108.

After mobile device 102 adds visiting network 108 to the block list, mobile device 102 initiates a block-list timer corresponding to visiting network 108 to begin the blocked time. The blocked time measured by the block-list timer may have any suitable value, according to particular needs. Subsequently, mobile device 102 may determine whether the block-list timer has expired. In response to determining that the block-list timer has expired, mobile device 102 removes visiting network 108 from the block list.

The following example use cases may assist in understanding aspects of the present disclosure. These examples are not intended to limit the present disclosure.

As a first example, a user of mobile device 102 may initially be connected to home network 106 in the user's home country and have full access to all of the services to which the user (and associated mobile device 102) is subscribed. The user may board an airplane to travel to a foreign country, possibly placing mobile device 102 in so-called "airplane mode" during the flight. When the user lands in the foreign country, the user may turn off airplane mode and mobile device 102 may attempt to connect to a visiting network 108 that is available in the foreign country. Visiting network 108 may reject the attempt by mobile device 102 to connect to visiting network 108, and mobile device 102 may initiate the limited service timer and enter the associated limited-services state. At a later time, the user may board an airplane to return to the user's home country, again possibly placing mobile device 102 in so-called "airplane mode" during the return flight. When the user lands in the home country, the user may turn off airplane mode and mobile device 102 may attempt to connect to home network 106 that is available in the home country. Assuming that the limited-services timer has not expired, the user may be surprised to find that the user is unable to connect to home network 106 to access various services to which the user is subscribed. Embodiments of the present disclosure, however, permit mobile device 102 to attempt to connect to home network 106 prior to expiration of the limited service timer and without a power-cycling of mobile device 102, so that mobile device 102 can attempt to access services to which the user is subscribed.

As another example, mobile device 102 may be moving around in an area in which both home network 106 and visiting network 108 overlap or are otherwise relatively close to one another. For example, as shown in FIG. 1, mobile device 102 may be moving around in area 114. Area 114, as just one example, could be located at a border between two countries. A mobile device 102 located in area 114 could experience frequent disconnects from home network 106 and attempts to connect to visiting network 108, the latter of which may result in rejections from visiting network 108. Embodiments of the present disclosure may allow mobile device 102 to quickly reestablish service on home network 106, without a power-cycling of mobile device 102 or waiting for the limited-services timer to expire. Additionally, embodiments of the present disclosure that implement a block list may reduce or eliminate instances of mobile device 102 attempting to connect to visited network 108 once visited network 108 has rejected mobile device 102.

Figure 2:
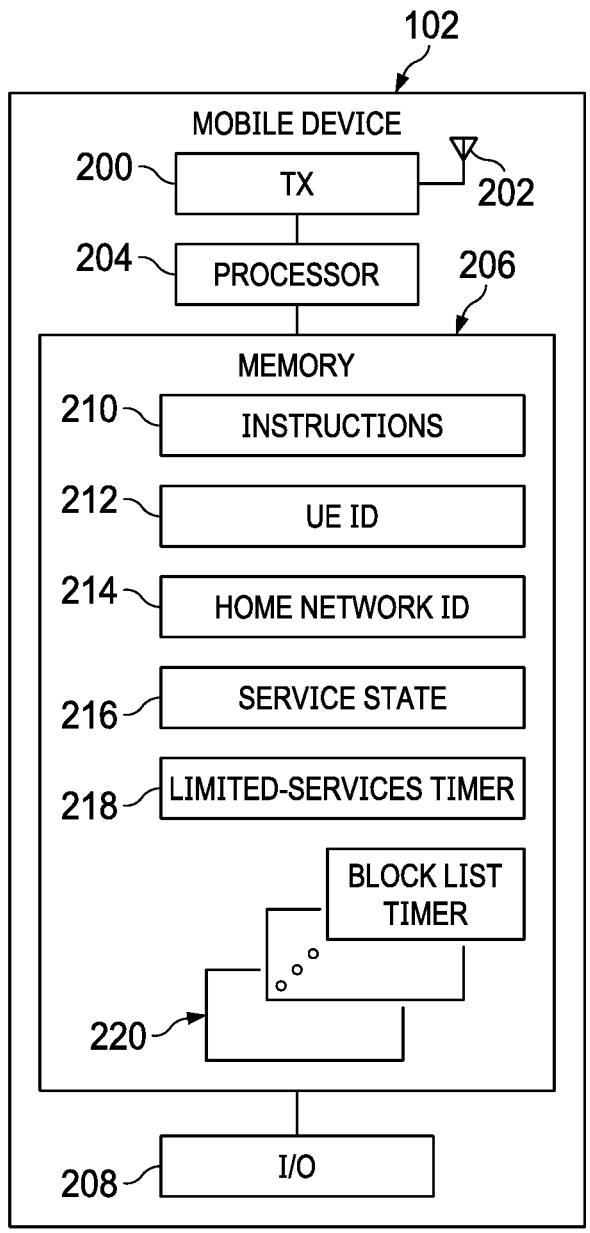
FIG. 2 illustrates example features of an example mobile device, according to certain embodiments of the present disclosure.

FIG. 2 illustrates example features of an example mobile device 102, according to certain embodiments of the present disclosure. In the illustrated example, mobile device 102 includes transceiver 200, antenna 202, processor 204, memory 206, and input/output (I/O) devices 208. Although mobile device 102 is illustrated as including particular components, this disclosure contemplates mobile device 102 including fewer, additional, and other components, if appropriate.

Transceiver 200 is configured to modulate data or other content for transmission by at least one antenna 202. Transceiver 200 is also configured to demodulate data or other content received by the at least one antenna 202. Transceiver 200 includes any suitable structure for generating signals for wireless transmission and/or processing signals received wirelessly. Antenna 202 includes any suitable structure for transmitting and/or receiving wireless signals. Mobile device 102 may include one or multiple transceivers 200 and one or multiple antennas 202. Although shown as a single functional unit, transceiver 200 could also be implemented using at least one transmitter and at least one separate receiver. Although mobile device 102 is illustrated and described as including transceiver 200 and antenna 202, this disclosure contemplates mobile device 102 including any suitable network interface (in addition or as an alternative to transceiver 200 and antenna 202) for providing wireless connectivity in system 100.

Processor 204 includes any combination of hardware, firmware, and software that operates to control and process information. Processor 204 may be a programmable logic device, a central processing unit, a microcontroller, a microprocessor, a digital signal processor, a field programmable gate array, an application specific integrated circuit, any processing device, or any combination of the preceding. Processor 204 may be configured to read and process instructions stored in memory 206. Although illustrated as a single functional unit, this disclosure contemplates mobile device including any suitable number of processors.

Memory 206 stores, either permanently or temporarily, data, operational instructions (e.g., software), or other information for access and/or execution by processor 204. Memory 206 includes any one or a combination of volatile or non-volatile local or remote devices for storing information. For example, memory 206 may include static or dynamic random access memory (RAM), read-only memory (ROM), magnetic storage devices, optical storage devices, hard disks, subscriber identity module (SIM) cards, memory sticks, secure digital (SD) memory cards, or any other information storage device or a combination of these devices. In certain embodiments, at least a portion of memory 206 is non-transitory. Although a single memory 206 is illustrated, mobile device 102 may include any number of memories 206. Among other potential data, memory 206 stores programming for execution by the processor 204 to cause processor 204 to perform operations associated with mobile device 102.

Mobile device 102 includes one or more I/O devices 208. I/O devices 208 facilitate interaction with a user of mobile device 102. Each I/O device 208 includes any suitable structure for providing information to or receiving information from a user, such as a speaker, microphone, keypad, keyboard, display, or touch screen.

Memory 206 may store a variety of information to facilitate operations described in this disclosure. In the illustrated example, memory 206 stores instructions 210, a UE identifier (ID) 212, a home network ID 214, a service state 216, a limited-services counter 218, and a block list timer 220. Each of these is described in greater detail below.

Instructions 210 may be implemented in any suitable combination of hardware, firmware, and software, and may provide the logic for performing operations described with respect to mobile device 102. For example, processor 204 may execute instructions 210 to cause processor to perform operations described with respect to mobile device 102 in this disclosure.

UE ID 212 may include one or more unique identifiers of mobile device 102 and/or a user of mobile device 102. For example, UE ID 212 may include any suitable combination of SIM card number, an IMSI number, or any other suitable unique identifier of mobile device 102 and/or a user of mobile device 102. Mobile device 102 and/or a communication network (e.g., home network 106 or visiting network 108) may use UE ID 212 when mobile device 102 attempts to register with the communication network. UE ID 212 could also serve as the basis for visiting network 108 to reject an attempt by mobile device 102 to connect to visiting network 108, as described above.

Home network ID 214 may include an identifier of home network 106 for mobile device 102. As described above, for example, mobile device 102 may know the identity of home network (e.g., home network ID 214) of mobile device 102, and may determine that home network 106 is accessible to mobile device 102 by comparing the identity of the PLMN contained in the SystemInformationBlockType1 message received from a network (e.g., from communications controller 104a of home network 106) with home network ID 214 to determine whether a detected network is the home network of mobile device 102.

Service state 216 may be used by mobile device 102 to indicate which services are available to mobile device 102. For example, when the limited-services timer (limited-services timer 218, described below) is not running and when mobile device is connected to home network 106, service state 216 may indicate that all services to which mobile device 102 is subscribed are available to mobile device 102. As another example, when the limited-services timer (limited-services timer 218, described below) is not running and when mobile device is connected to visiting network 108, service state 216 may indicate that some or all of the services to which mobile device 102 is subscribed are available to mobile device 102, depending on the subscription plan associated with mobile device 102. As another example, when the limited-services timer (limited-services timer 218, described below) is running, service state 216 may indicate that mobile device 102 is in a limited-services state in which mobile device 102 is unable to access one or more of the services to which mobile device 102 is subscribed.

Limited-services timer 218 is a counter that is initiated by mobile device 102 in response to certain rejections by a network (e.g., certain rejections by visiting network 108) to initiate a limited-services state for mobile device 102. Limited-services timer 218 may have any suitable duration. In certain embodiments, at each initiation of limited-services timer 218, mobile device 102 randomly selects the duration of limited-services timer 218 from a range of twelve to twenty-four hours. Although this duration and manner of selection is described, this disclosure contemplates limited-services timer 218 having any suitable duration and that duration being selected in any suitable manner. Furthermore, this disclosure contemplates a network element other than mobile device 102 selecting the duration of limited-service timer 218.

Block list timer 220 is a counter for determining how long a particular network (e.g., a visiting network that from which mobile device 102 received a rejection) should be kept on a block list such that mobile device 102 does not attempt to connect to that network until expiration of block list timer 220. Mobile device 102 may store multiple instances of block list timer 220, each corresponding to a different network (e.g., a different visiting network). Use of a block list and associated block list timer 220 may reduce processing by mobile device 102 in attempting to connect to visiting networks that already have rejected mobile device 102 (and that likely would continue to reject mobile device 102) and processing by communications controllers 104 and/or other elements of visiting networks that already have rejected mobile device 102 (and that likely would continue to reject mobile device 102).

Figure 3:
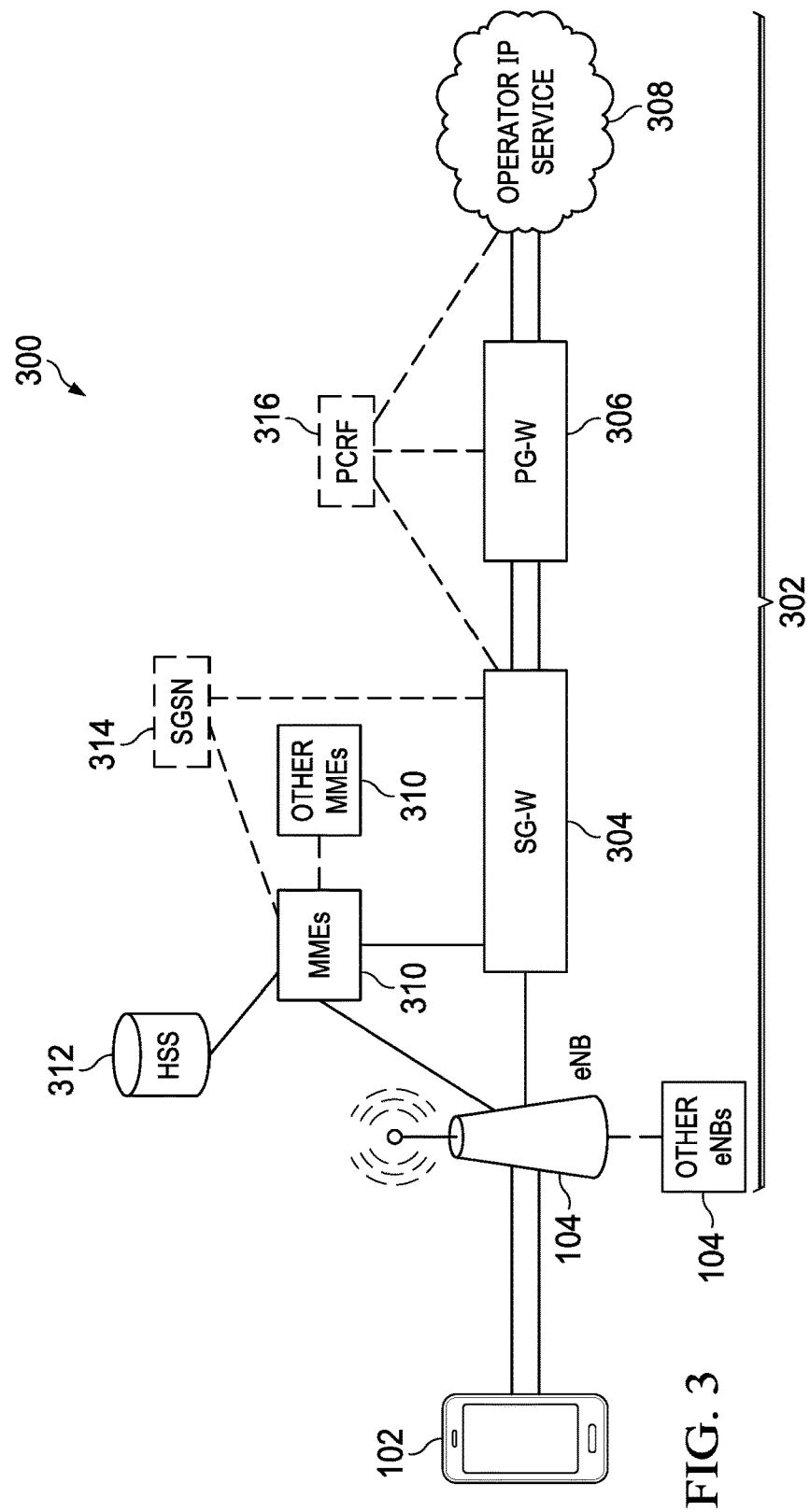
FIG. 3 illustrates an example system in which a mobile device is connected to an example network infrastructure, according to certain embodiments of the present disclosure.

FIG. 3 illustrates an example system 300 in which mobile device 102 is connected to an example network infrastructure 302, according to certain embodiments of the present disclosure. Mobile device 102, such as a UE, attempts to access network infrastructure 302 via a communications controller 104 (e.g., an eNB) of network infrastructure 302. Network infrastructure 302 may be associated with a home network (e.g., home network 106) of mobile device 102 or a visiting network (e.g., visiting network 108) of mobile device 102.

In the illustrated example, network infrastructure 302 includes one or more communications controllers 104, a Serving Gateway (SGW) 304, a Packet Data Network Gateway (PGW) 306, an operator IP service 308, one or more Mobility Management Entities (MMEs) 310, and an HSS 312.

SGW 304 may route and forward data packets from mobile device 102. SGW 304 may also assist with handovers of mobile device 102 between communications controllers 104 with transfers of mobile device 102 between various communication technologies (e.g., between LTE and other 3GPP technologies). SGW 304 may provide a variety of other features, according to applicable standards or implementations.

PGW 306 may connect mobile device 102 to external packet data networks, serving as the entry and exit point of traffic for mobile device 102. PGW 306 may perform policy enforcement, packet filtering, and charging support. PGW 306 may provide a variety of other features, according to applicable standards or implementations.

Operator IP service 308 includes any packet data network that may be provided over a network. For example, operator IP service 308 may include the Internet.

MME 310 may access by mobile devices 102 to network infrastructure 302. MME 310, for example, may handle idle mode mobile device 102 (e.g., UE) paging. Through interaction with HSS 312, described below, MME 310 may authenticate mobile devices 102 and may evaluate authorization of mobile device 312 to connect to a service provider's PLMN and enforce roaming restrictions for mobile device 312. MME 310 may also provide the control plane function for mobile device 102 moving various communication technologies (e.g., between LTE and 2G/3G access networks). MME 310 may provide a variety of other features, according to applicable standards or implementations.

HSS 312 may include a central database that contains user-related and subscription-related information. The HSS may assist with mobility management, call and session establishment support, user authentication, and access authorization. In certain embodiments, HSS 312 stores the identities of mobile devices for which network infrastructure 302 (or a portion of network infrastructure 302) the home network.

When mobile device 102 attempts to connect to network infrastructure 302 (e.g., in response to detecting a SystemInformationBlockType1 message from communications controller 104), a suitable combination of communications controller 104, MME 310, and HSS 312 may determine whether to accept or reject the attempt by mobile device 102 to connect to network infrastructure 302. For example, communications controller 104 may forward a request from mobile device 102 to connect to network infrastructure 302 to MME 310. The request may include UE ID 212 of mobile device 102. MME 310 may access HSS 312 to determine whether to accept or reject the request from mobile device 102, and may communicate the decision to communications controller 104 for forwarding to mobile device 102. In certain embodiments, when network infrastructure 302 corresponds to a visiting network (and other appropriate conditions for a rejection are met) this decision may include the rejection in response to which mobile device 102 initiates limited-services timer 218.

Network infrastructure 302 may include Serving GPRS Support Node (SGSN) 314 and Policy and Charging Rules Function (PCRF) 316. SGSN 314 may be a node that serves mobile device 102, keeps track of the location of mobile device 102, and performs security functions and access control. SGSN 314 is responsible for the delivery of data packets from and to the mobile devices 102 within its geographical service area. SGSN 314 may provide a variety of other features, according to applicable standards or implementations. PCRF 316 may be a software node that determines, in real-time, policy rules in a multimedia network. PCRF 316 may provide a variety of other features, according to applicable standards or implementations.

Figure 4:
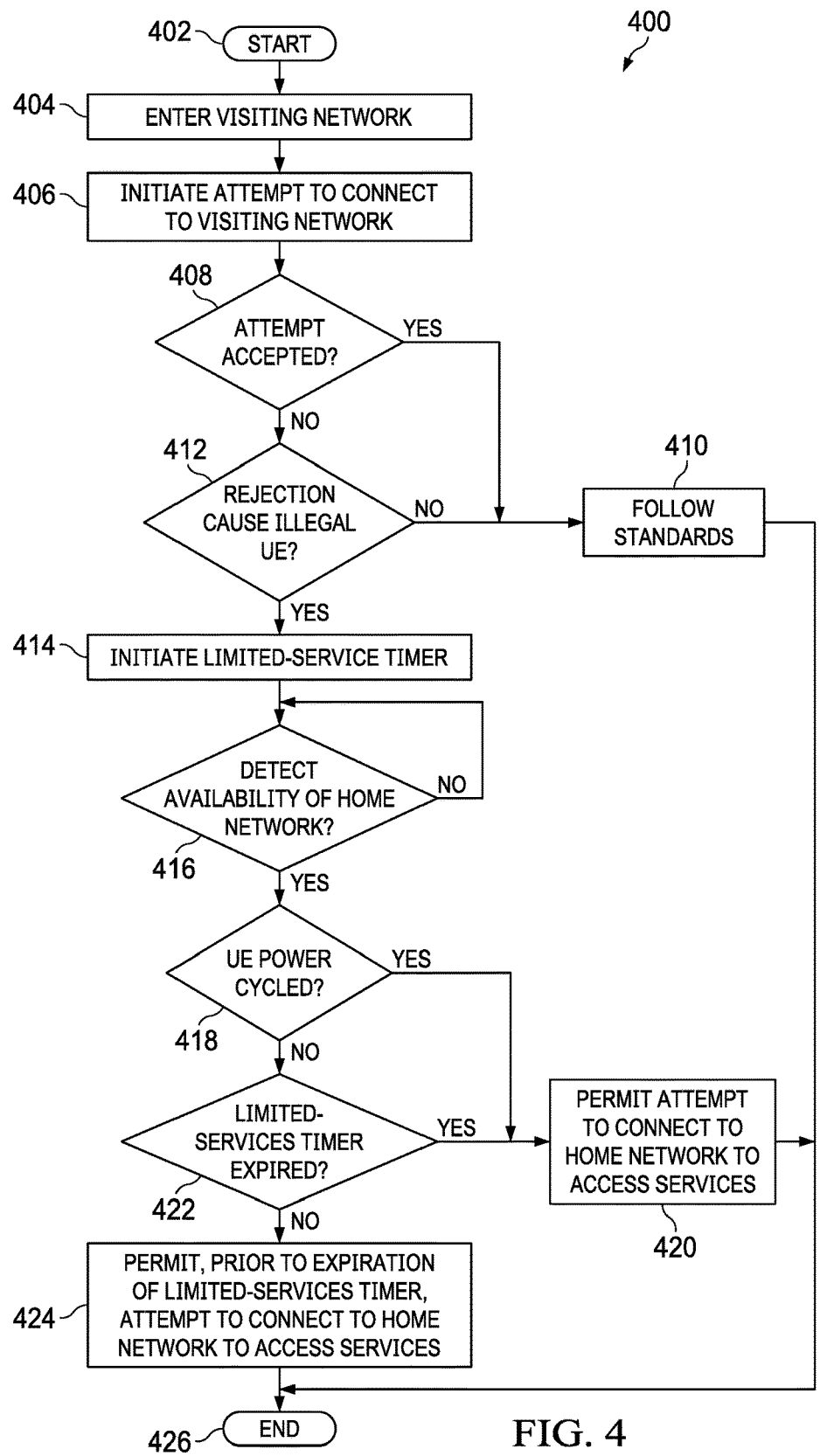
FIG. 4 illustrates an example method for restoring service on a home network of a UE in which a visiting network rejected the UE as an illegal UE, according to certain embodiments of the present disclosure.

FIG. 4 illustrates an example method 400 for restoring service on a home network of a UE in which a visiting network rejected the UE as an illegal UE, according to certain embodiments of the present disclosure. For purposes of example method 400, mobile device 102 is assumed to be a UE; however, one of ordinary skill in the art will appreciate that method 400 may apply to any suitable mobile device.

The method begins at step 402. At step 404, mobile device 102 enters a visiting network 108. For example, mobile device 102 may move from home network 106 of mobile device 102 to visiting network 108 by changing geographical locations of mobile device 102. As another example, mobile device 102 may enter visiting network 108 by powering on from a powered down state such that mobile device 102 powers on and first attempts to access visiting network 108. As another example, mobile device 102 may enter visiting network 108 after a radio of mobile device 102 is re-enabled after having been disengaged (e.g., in a so-called "airplane mode" of mobile device 102). As yet another example, mobile device 102 may enter visiting network 108 based on any suitable combination of the foregoing or in any other suitable manner. Although this disclosure describes particular examples of mobile device 102 entering visiting network 108, this disclosure contemplates mobile device 102 entering visiting network 108 in any suitable manner.

In certain embodiments, when mobile device 102 enters visiting network 108, mobile device 102 has moved out of a coverage area 110a of home network 106, such that mobile device 102 is no longer connected to home network 106, and is now within coverage area 110b of visiting network 108.

At step 406, mobile device 102 initiates an attempt to connect to visiting network 108. For example mobile device 102 may attempt to connect to visiting network 108 via communications controller 104b. As described above, mobile device 102 may attempt to connect to visiting network 108 in any suitable manner. For example, mobile device 102 may transmit one or more of a registration request, an RAU, an LAU, and a TAU to a suitable element of visiting network 108, such as to communications controller 104b of visiting network 108. In certain embodiments, mobile device 102 may transmit any of these requests and/or updates whether in an idle or active state. Furthermore, in certain embodiments, mobile device 102 may attempt to connect to visiting network in response to mobile device 102 detecting a signal broadcast or otherwise transmitted by visiting network 108 (e.g., a signal broadcast by communications controller 104b).

At step 408, mobile device 102 determines whether the attempt to connect to visiting network 108 was accepted by visiting network 108. For example, mobile device 102 may determine whether mobile device 102 received a rejection from controller 104b of visiting network 108 or an acceptance from controller 104b of visiting network 108.

If mobile device 102 determines at step 408 that visiting network 108 accepted the attempt by mobile device 102 to connect to visiting network 108, then mobile device 102 may proceed to step 410 to follow appropriate communication standards for connecting to visiting network 108.

If, on the other hand, mobile device 102 determines at step 408 that visiting network 108 did not accept the attempt by mobile device 102 to connect to visiting network 108, then at step 412 mobile device 102 determines whether the cause of the rejection by visiting network 108 is an illegal UE. If mobile device 102 determines at step 412 that the cause of the rejection by visiting network 108 is not an illegal UE, then mobile device 102 may proceed to step 410 to follow appropriate communication standards. If, on the other hand, mobile device 102 determines at step 412 that the cause of the rejection by visiting network 108 is an illegal UE, then mobile device 102 may proceed to step 414.

At step 414, mobile device 102 initiates, in response to the illegal UE rejection from visiting network 104, limited-services timer 218. As described above, limited-services timer 218 may initiate a limited-services state for mobile device 102. During the limited-services state, mobile device 102 may be prevented from accessing the one or more services both on visiting network 108 and on home network 106. This can create inefficiencies in the operation of mobile device 102 and an unpleasant experience for a user of mobile device 102. For example, even when mobile device 102 returns to home network 106 of mobile device 102, mobile device 102 remains unable to access services that should be available to mobile device 102 (and its associated user). While powering down and restarting mobile device 102 may reset the limited-services timer and restore services to mobile device 102, powering down and restarting mobile device 102 is inconvenient for a user of mobile device 102 and likely increases the power consumption and associated battery drain of mobile device 102.

At step 416, mobile device 102 determines whether mobile device 102 detects availability of home network 106. In certain embodiments, mobile device 102 can detect home network 106 whether mobile device 102 is in active mode or idle mode. Mobile device 102 may detect availability of home network 106 in a variety of ways. As a first example, mobile device 102 may compare information (e.g., network identifier information) received in a message (e.g., a SystemInformationBlockType1 message) communicated by communications controller 104a (e.g., an eNB) and compares that information to home network ID 214 to determine whether the network identified in the received message is home network 106 of mobile device 102. As a second example, mobile device 102 may determine that home network 106 is accessible to mobile device 102 using global positioning system (GPS) information.

Although this disclosure describes particular techniques for determining that home network 106 is accessible to mobile device 102, it should be understood that this disclosure contemplates using any suitable technique for determining that home network 106 is accessible to mobile device 102.

If mobile device 102 determines at step 416 that home network 106 is not available to mobile device 102 (e.g., if mobile device 102 does not detect home network 106), then mobile device 102 may continue to determine whether home network 106 is detected. If mobile device 102 determines at step 416 that mobile device 102 does detect home network 106, then the mobile device 102 may proceed to step 418.

At step 418, mobile device 102 determines whether a power cycle has occurred. For example, mobile device 102 may determine whether it has been powered down and restarted. In certain embodiments, if mobile device 102 determines at step 418 that mobile device 102 has been power cycled, then mobile device 102 may proceed to step 420, described below. If mobile device 102 determines at step 418 that a power cycle has not occurred, then mobile device 102 proceeds to step 422.

Although step 418 is described as mobile device 102 determining whether a power cycle has occurred, this disclosure contemplates step 418 being an explicit determination by mobile device 102 or not being an explicit determination by mobile device 102. For example, if a power cycle occurs, mobile device 102 may simply proceed to step 420 by virtue of the power cycle having occurred and without making an explicit determination that the power cycle occurred. As another example, if a power cycle does not occur, mobile device 102 may proceed to step 422 by virtue of the power cycle not having occurred and without making an explicit determination that the power cycle did not occur.

At step 420, mobile device 102 is permitted to attempt to connect to home network 106 to access services. As an example, mobile device 102 is permitted to attempt to connect to home network 106 to access at least some of, if not all of, the services to which mobile device 102 is subscribed on home network 106. The power cycling (e.g., powering down and restarting) of mobile device 102 may reset limited-services timer 218, and, when combined with mobile device 102 detecting availability of home network 106, results in mobile device 102 being permitted to attempt to connect to home network 106 to access services.

At step 422, mobile device 102 determines whether limited-services timer 218 has expired. If mobile device 102 determines at step 422 that limited-services timer 218 has expired, then mobile device 102 may proceed to step 420 at which mobile device 102 is permitted to attempt to connect to home network 106 to access services. As an example, mobile device 102 is permitted to attempt to connect to home network 106 to access at least some of, if not all of, the services to which mobile device 102 is subscribed on home network 106. The expiration of limited-services timer 218, when combined with mobile device 102 detecting availability of home network 106, results in mobile device 102 being permitted to attempt to connect to home network 106 to access services. If mobile device 102 determines at step 422 that limited-services timer 218 has not expired, then mobile device 102 proceeds to step 424.

At step 424, mobile device 102 is permitted, prior to the expiration of limited-services timer 218, to attempt to connect to home network 106 to access services. As an example, mobile device 102 is permitted to attempt to connect to home network 106 to access at least some of, if not all of, the services to which mobile device 102 is subscribed on home network 106. Such services may include services that mobile device 102 was prevented from accessing in the limited service state, even on home network 106 of mobile device 102. In certain embodiments, to restore the ability to attempt to connect to home network 106 to access those services, mobile device may be configured to ignore the limited service timer (and allow the limited service timer to expire in the background) or to reset the limited-services timer such that the limited service timer no longer is running and/or is reset to zero.

In certain embodiments, because mobile device 102 detected availability of home network 106 (at step 416) and without an inconvenient power cycling of mobile device 102 at step 418, mobile device is permitted to attempt to access home network 106, even though limited-services timer 218 had not expired. In certain embodiments, this provides a more efficient recovery-of-services process for mobile device 102 and potentially enhances the user experience of the user of mobile device 102.

At step 426, the method ends.

Figure 5:
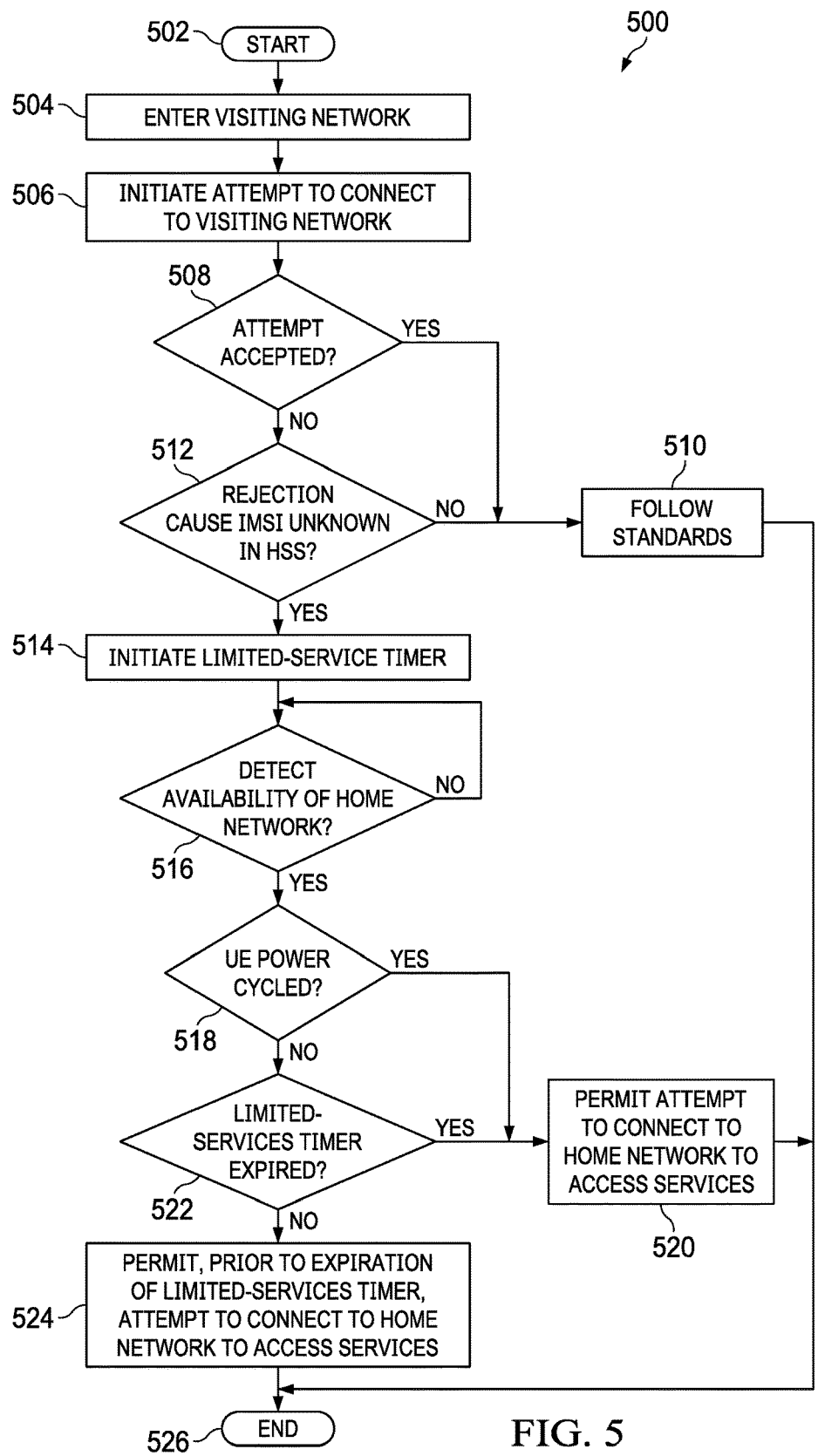
FIG. 5 illustrates an example method for restoring service on a home network of a UE in which a visiting network rejected the UE due to an unknown international mobile subscriber identity (IMSI) in home subscriber server (HSS), according to certain embodiments of the present disclosure.

FIG. 5 illustrates an example method 500 for restoring service on a home network of a UE in which a visiting network rejected the UE due to an IMSI unknown in HSS, according to certain embodiments of the present disclosure. For purposes of example method 500, mobile device 102 is assumed to be a UE; however, one of ordinary skill in the art will appreciate that method 500 may apply to any suitable mobile device. Method 500 illustrated in FIG. 5 differs from method 400 illustrated in FIG. 4 at least in part due to the reason for the rejection of the mobile device by the visiting network, as shown in steps 412 and 512, respectively.

The method begins at step 502. At step 504, mobile device 102 enters a visiting network 108. For example, mobile device 102 may move from home network 106 of mobile device 102 to visiting network 108 by changing geographical locations of mobile device 102. As another example, mobile device 102 may enter visiting network 108 by powering on from a powered down state such that mobile device 102 powers on and first attempts to access visiting network 108. As another example, mobile device 102 may enter visiting network 108 after a radio of mobile device 102 is re-enabled after having been disengaged (e.g., in a so-called "airplane mode" of mobile device 102). As yet another example, mobile device 102 may enter visiting network 108 based on any suitable combination of the foregoing or in any other suitable manner. Although this disclosure describes particular examples of mobile device 102 entering visiting network 108, this disclosure contemplates mobile device 102 entering visiting network 108 in any suitable manner.

In certain embodiments, when mobile device 102 enters visiting network 108, mobile device 102 has moved out of a coverage area 110a of home network 106, such that mobile device 102 is no longer connected to home network 106, and is now within coverage area 110b of visiting network 108.

At step 506, mobile device 102 initiates an attempt to connect to visiting network 108. For example mobile device 102 may attempt to connect to visiting network 108 via communications controller 104b. As described above, mobile device 102 may attempt to connect to visiting network 108 in any suitable manner. For example, mobile device 102 may transmit one or more of a registration request, an RAU, an LAU, and a TAU to a suitable element of visiting network 108, such as to communications controller 104b of visiting network 108. In certain embodiments, mobile device 102 may transmit any of these requests and/or updates whether in an idle or active state. Furthermore, in certain embodiments, mobile device 102 may attempt to connect to visiting network in response to mobile device 102 detecting a signal broadcast or otherwise transmitted by visiting network 108 (e.g., a signal broadcast by communications controller 104b).

At step 508, mobile device 102 determines whether the attempt to connect to visiting network 108 was accepted by visiting network 108. For example, mobile device 102 may determine whether mobile device 102 received a rejection from controller 104b of visiting network 108 or an acceptance from controller 104b of visiting network 108.

If mobile device 102 determines at step 508 that visiting network 108 accepted the attempt by mobile device 102 to connect to visiting network 108, then mobile device 102 may proceed to step 510 to follow appropriate communication standards for connecting to visiting network 108.

If, on the other hand, mobile device 102 determines at step 508 that visiting network 108 did not accept the attempt by mobile device 102 to connect to visiting network 108, then at step 512 mobile device 102 determines whether the cause of the rejection by visiting network 108 is an IMSI unknown in HSS. If mobile device 102 determines at step 512 that the cause of the rejection by visiting network 108 is not an IMSI unknown in HSS, then mobile device 102 may proceed to step 510 to follow appropriate communication standards. If, on the other hand, mobile device 102 determines at step 512 that the cause of the rejection by visiting network 108 is an IMSI unknown in HSS, then mobile device 102 may proceed to step 514.

At step 514, mobile device 102 initiates, in response to the IMSI unknown in HSS rejection from visiting network 104, limited-services timer 218. As described above, limited-services timer 218 may initiate a limited-services state for mobile device 102. During the limited-services state, mobile device 102 may be prevented from accessing the one or more services both on visiting network 108 and on home network 106. This can create inefficiencies in the operation of mobile device 102 and an unpleasant experience for a user of mobile device 102. For example, even when mobile device 102 returns to home network 106 of mobile device 102, mobile device 102 remains unable to access services that should be available to mobile device 102 (and its associated user). While powering down and restarting mobile device 102 may reset the limited-services timer and restore services to mobile device 102, powering down and restarting mobile device 102 is inconvenient for a user of mobile device 102 and likely increases the power consumption and associated battery drain of mobile device 102.

At step 516, mobile device 102 determines whether mobile device 102 detects availability of home network 106. In certain embodiments, mobile device 102 can detect home network 106 whether mobile device 102 is in active mode or idle mode. Mobile device 102 may detect availability of home network 106 in a variety of ways. As a first example, mobile device 102 may compare information (e.g., network identifier information) received in a message (e.g., a SystemInformationBlockType1 message) communicated by communications controller 104a (e.g., an eNB) and compares that information to home network ID 214 to determine whether the network identified in the received message is home network 106 of mobile device 102. As a second example, mobile device 102 may determine that home network 106 is accessible to mobile device 102 using global positioning system (GPS) information.

[oils] Although this disclosure describes particular techniques for determining that home network 106 is accessible to mobile device 102, it should be understood that this disclosure contemplates using any suitable technique for determining that home network 106 is accessible to mobile device 102.

If mobile device 102 determines at step 516 that home network 106 is not available to mobile device 102 (e.g., if mobile device 102 does not detect home network 106), then mobile device 102 may continue to determine whether home network 106 is detected. If mobile device 102 determines at step 516 that mobile device 102 does detect home network 106, then the mobile device 102 may proceed to step 518.

At step 518, mobile device 102 determines whether a power cycle has occurred. For example, mobile device 102 may determine whether it has been powered down and restarted. In certain embodiments, if mobile device 102 determines at step 518 that mobile device 102 has been power cycled, then mobile device 102 may proceed to step 520, described below. If mobile device 102 determines at step 518 that a power cycle has not occurred, then mobile device 102 proceeds to step 522.

Although step 518 is described as mobile device 102 determining whether a power cycle has occurred, this disclosure contemplates step 518 being an explicit determination by mobile device 102 or not being an explicit determination by mobile device 102. For example, if a power cycle occurs, mobile device 102 may simply proceed to step 520 by virtue of the power cycle having occurred and without making an explicit determination that the power cycle occurred. As another example, if a power cycle does not occur, mobile device 102 may proceed to step 522 by virtue of the power cycle not having occurred and without making an explicit determination that the power cycle did not occur.

At step 520, mobile device 102 is permitted to attempt to connect to home network 106 to access services. As an example, mobile device 102 is permitted to attempt to connect to home network 106 to access at least some of, if not all of, the services to which mobile device 102 is subscribed on home network 106. The power cycling (e.g., powering down and restarting) of mobile device 102 may reset limited-services timer 218, and, when combined with mobile device 102 detecting availability of home network 106, results in mobile device 102 being permitted to attempt to connect to home network 106 to access services.

At step 522, mobile device 102 determines whether limited-services timer 218 has expired. If mobile device 102 determines at step 522 that limited-services timer 218 has expired, then mobile device 102 may proceed to step 520 at which mobile device 102 is permitted to attempt to connect to home network 106 to access services. As an example, mobile device 102 is permitted to attempt to connect to home network 106 to access at least some of, if not all of, the services to which mobile device 102 is subscribed on home network 106. The expiration of limited-services timer 218, when combined with mobile device 102 detecting availability of home network 106, results in mobile device 102 being permitted to attempt to connect to home network 106 to access services. If mobile device 102 determines at step 522 that limited-services timer 218 has not expired, then mobile device 102 proceeds to step 524.

At step 524, mobile device 102 is permitted, prior to the expiration of limited-services timer 218, to attempt to connect to home network 106 to access services. As an example, mobile device 102 is permitted to attempt to connect to home network 106 to access at least some of, if not all of, the services to which mobile device 102 is subscribed on home network 106. Such services may include services that mobile device 102 was prevented from accessing in the limited service state, even on home network 106 of mobile device 102. In certain embodiments, to restore the ability to attempt to connect to home network 106 to access those services, mobile device may be configured to ignore the limited service timer (and allow the limited service timer to expire in the background) or to reset the limited-services timer such that the limited service timer no longer is running and/or is reset to zero.

In certain embodiments, because mobile device 102 detected availability of home network 106 (at step 516) and without an inconvenient power cycling of mobile device 102 at step 518, mobile device is permitted to attempt to access home network 106, even though limited-services timer 218 had not expired. In certain embodiments, this provides a more efficient recovery-of-services process for mobile device 102 and potentially enhances the user experience of the user of mobile device 102.

At step 526, the method ends.

Figure 6:
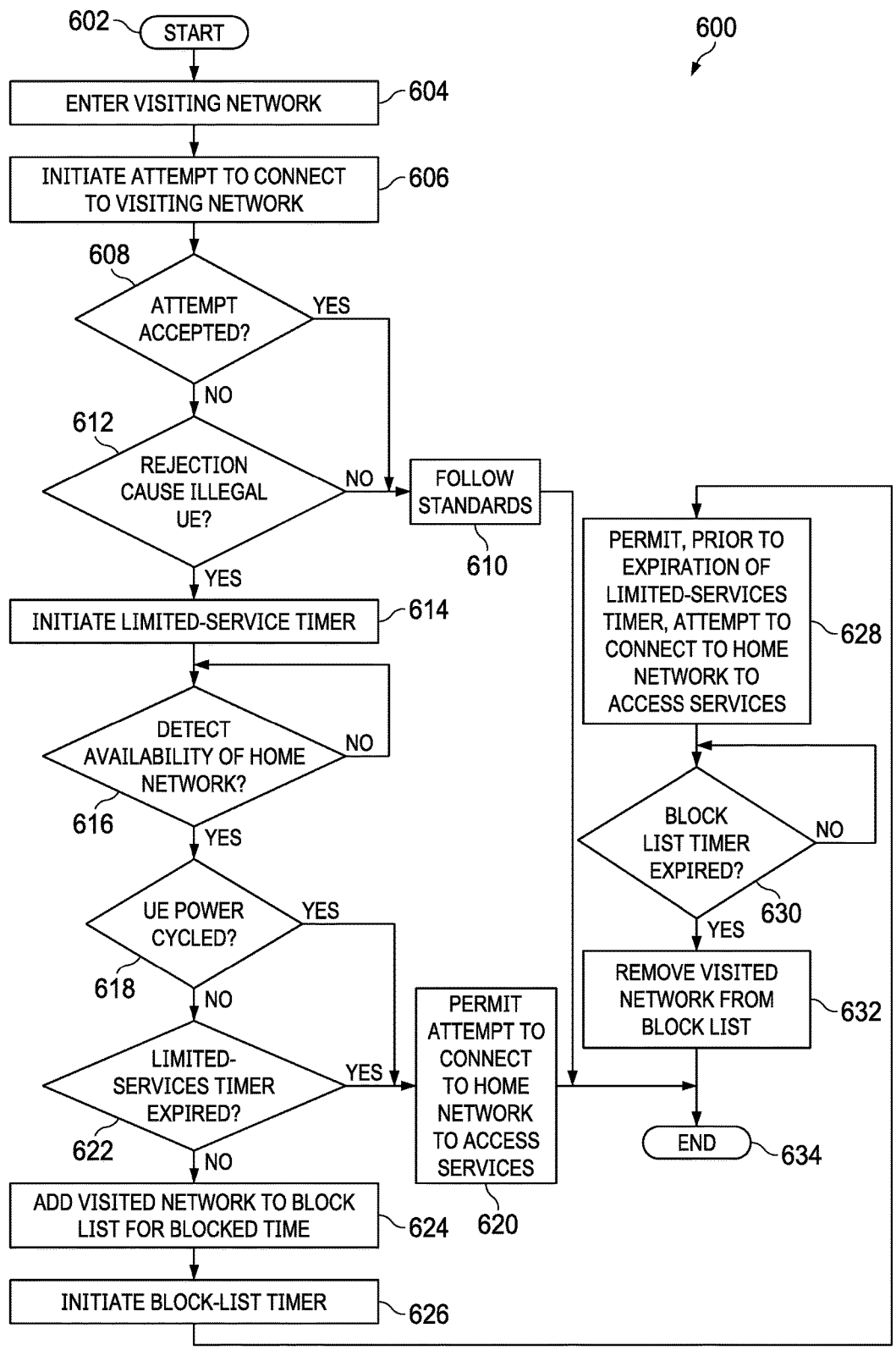
FIG. 6 illustrates an example method for restoring service on a home network of a UE in which a visiting network rejected the UE as an illegal UE and in which the visiting network is added to a block list, according to certain embodiments of the present disclosure.

FIG. 6 illustrates an example method 60o for restoring service on a home network of a UE in which a visiting network rejected the UE as an illegal UE and in which the visiting network is added to a block list, according to certain embodiments of the present disclosure. For purposes of example method 600, mobile device 102 is assumed to be a UE; however, one of ordinary skill in the art will appreciate that method 60o may apply to any suitable mobile device. Method boo illustrated in FIG. 6 differs from method 400 illustrated in FIG. 4 at least in part due to the implementation in method 600 of a block list and associated block-list timer for blocking attempts to access visiting network 108.

The method begins at step 602. At step 604, mobile device 102 enters a visiting network 108. For example, mobile device 102 may move from home network 106 of mobile device 102 to visiting network 108 by changing geographical locations of mobile device 102. As another example, mobile device 102 may enter visiting network 108 by powering on from a powered down state such that mobile device 102 powers on and first attempts to access visiting network 108. As another example, mobile device 102 may enter visiting network 108 after a radio of mobile device 102 is re-enabled after having been disengaged (e.g., in a so-called "airplane mode" of mobile device 102). As yet another example, mobile device 102 may enter visiting network 108 based on any suitable combination of the foregoing or in any other suitable manner. Although this disclosure describes particular examples of mobile device 102 entering visiting network 108, this disclosure contemplates mobile device 102 entering visiting network 108 in any suitable manner.

In certain embodiments, when mobile device 102 enters visiting network 108, mobile device 102 has moved out of a coverage area 110a of home network 106, such that mobile device 102 is no longer connected to home network 106, and is now within coverage area 110b of visiting network 108.

At step 606, mobile device 102 initiates an attempt to connect to visiting network 108. For example mobile device 102 may attempt to connect to visiting network 108 via communications controller 104b. As described above, mobile device 102 may attempt to connect to visiting network 108 in any suitable manner. For example, mobile device 102 may transmit one or more of a registration request, an RAU, an LAU, and a TAU to a suitable element of visiting network 108, such as to communications controller 104b of visiting network 108. In certain embodiments, mobile device 102 may transmit any of these requests and/or updates whether in an idle or active state. Furthermore, in certain embodiments, mobile device 102 may attempt to connect to visiting network in response to mobile device 102 detecting a signal broadcast or otherwise transmitted by visiting network 108 (e.g., a signal broadcast by communications controller 104b).

At step 608, mobile device 102 determines whether the attempt to connect to visiting network 108 was accepted by visiting network 108. For example, mobile device 102 may determine whether mobile device 102 received a rejection from controller 104b of visiting network 108 or an acceptance from controller 104b of visiting network 108.

If mobile device 102 determines at step 608 that visiting network 108 accepted the attempt by mobile device 102 to connect to visiting network 108, then mobile device 102 may proceed to step 610 to follow appropriate communication standards for connecting to visiting network 108.

If, on the other hand, mobile device 102 determines at step 608 that visiting network 108 did not accept the attempt by mobile device 102 to connect to visiting network 108, then at step 612 mobile device 102 determines whether the cause of the rejection by visiting network 108 is an illegal UE. If mobile device 102 determines at step 612 that the cause of the rejection by visiting network 108 is not an illegal UE, then mobile device 102 may proceed to step 610 to follow appropriate communication standards. If, on the other hand, mobile device 102 determines at step 612 that the cause of the rejection by visiting network 108 is an illegal UE, then mobile device 102 may proceed to step 614.

At step 614, mobile device 102 initiates, in response to the illegal UE rejection from visiting network 104, limited-services timer 218. As described above, limited-services timer 218 may initiate a limited-services state for mobile device 102. During the limited-services state, mobile device 102 may be prevented from accessing the one or more services both on visiting network 108 and on home network 106. This can create inefficiencies in the operation of mobile device 102 and an unpleasant experience for a user of mobile device 102. For example, even when mobile device 102 returns to home network 106 of mobile device 102, mobile device 102 remains unable to access services that should be available to mobile device 102 (and its associated user). While powering down and restarting mobile device 102 may reset the limited-services timer and restore services to mobile device 102, powering down and restarting mobile device 102 is inconvenient for a user of mobile device 102 and likely increases the power consumption and associated battery drain of mobile device 102.

At step 616, mobile device 102 determines whether mobile device 102 detects availability of home network 106. In certain embodiments, mobile device 102 can detect home network 106 whether mobile device 102 is in active mode or idle mode. Mobile device 102 may detect availability of home network 106 in a variety of ways. As a first example, mobile device 102 may compare information (e.g., network identifier information) received in a message (e.g., a SystemInformationBlockType1 message) communicated by communications controller 104a (e.g., an eNB) and compares that information to home network ID 214 to determine whether the network identified in the received message is home network 106 of mobile device 102. As a second example, mobile device 102 may determine that home network 106 is accessible to mobile device 102 using global positioning system (GPS) information.

Although this disclosure describes particular techniques for determining that home network 106 is accessible to mobile device 102, it should be understood that this disclosure contemplates using any suitable technique for determining that home network 106 is accessible to mobile device 102.

If mobile device 102 determines at step 616 that home network 106 is not available to mobile device 102 (e.g., if mobile device 102 does not detect home network 106), then mobile device 102 may continue to determine whether home network 106 is detected. If mobile device 102 determines at step 616 that mobile device 102 does detect home network 106, then the mobile device 102 may proceed to step 618.

At step 618, mobile device 102 determines whether a power cycle has occurred. For example, mobile device 102 may determine whether it has been powered down and restarted. In certain embodiments, if mobile device 102 determines at step 618 that mobile device 102 has been power cycled, then mobile device 102 may proceed to step 62o, described below. If mobile device 102 determines at step 618 that a power cycle has not occurred, then mobile device 102 proceeds to step 622.

Although step 618 is described as mobile device 102 determining whether a power cycle has occurred, this disclosure contemplates step 618 being an explicit determination by mobile device 102 or not being an explicit determination by mobile device 102. For example, if a power cycle occurs, mobile device 102 may simply proceed to step 620 by virtue of the power cycle having occurred and without making an explicit determination that the power cycle occurred. As another example, if a power cycle does not occur, mobile device 102 may proceed to step 622 by virtue of the power cycle not having occurred and without making an explicit determination that the power cycle did not occur.

At step 620, mobile device 102 is permitted to attempt to connect to home network 106 to access services. As an example, mobile device 102 is permitted to attempt to connect to home network 106 to access at least some of, if not all of, the services to which mobile device 102 is subscribed on home network 106. The power cycling (e.g., powering down and restarting) of mobile device 102 may reset limited-services timer 218, and, when combined with mobile device 102 detecting availability of home network 106, results in mobile device 102 being permitted to attempt to connect to home network 106 to access services.

At step 622, mobile device 102 determines whether limited-services timer 218 has expired. If mobile device 102 determines at step 622 that limited-services timer 218 has expired, then mobile device 102 may proceed to step 620 at which mobile device 102 is permitted to attempt to connect to home network 106 to access services. As an example, mobile device 102 is permitted to attempt to connect to home network 106 to access at least some of, if not all of, the services to which mobile device 102 is subscribed on home network 106. The expiration of limited-services timer 218, when combined with mobile device 102 detecting availability of home network 106, results in mobile device 102 being permitted to attempt to connect to home network 106 to access services. If mobile device 102 determines at step 622 that limited-services timer 218 has not expired, then mobile device 102 proceeds to step 624.

At step 624, mobile device 102 adds visiting network 108 to a block list for a blocked time. Mobile device 102 may forego attempting to connect to networks that are included on the block list for the blocked time. Because, in response to mobile device 102 detecting availability of home network 106 and determining that limited-services timer has not expired, mobile device may ignore or reset limited-services timer 218 (as described below with reference to step 628), it is possible that mobile device 102 may again detect visiting network 108 and attempt to connect to visiting network 108. This may be particularly possible when coverage area 110a of home network 106 and coverage area 110b of visiting network 108 overlap or are otherwise in relatively close proximity to one another. As a particular example, this may be particularly possible when a mobile device 102 moves around in area 114 shown in FIG. 1C.

These repeated attempts by mobile device 102 to access visiting network 108 could result in a waste of processing and network resources for both mobile device 102 and elements of visiting network 108. Visiting network 108 likely would again reject mobile device 102 for the same reasons, and both visiting network 108 and mobile device 102 would have to waste processing and network resources to again determine that mobile device 102 is rejected. In certain embodiments, adding a visiting network 108 that rejected mobile device 102 to a block list for a blocked time may reduce or eliminate instances of mobile device 102 repeatedly attempting to access visiting network 108, which may save processing and/or network resources of mobile device 102 and visiting network 108.

At step 626, mobile device 102 initiates a block-list timer 220 corresponding to visiting network 108 to begin the blocked time. The blocked time measured by block-list timer 220 may have any suitable value, according to particular needs.

At step 628, mobile device 102 is permitted, prior to the expiration of limited-services timer 218, to attempt to connect to home network 106 to access services. As an example, mobile device 102 is permitted to attempt to connect to home network 106 to access at least some of, if not all of, the services to which mobile device 102 is subscribed on home network 106. Such services may include services that mobile device 102 was prevented from accessing in the limited service state, even on home network 106 of mobile device 102. In certain embodiments, to restore the ability to attempt to connect to home network 106 to access those services, mobile device may be configured to ignore the limited service timer (and allow the limited service timer to expire in the background) or to reset the limited-services timer such that the limited service timer no longer is running and/or is reset to zero.

In certain embodiments, because mobile device 102 detected availability of home network 106 (at step 616) and without an inconvenient power cycling of mobile device 102 at step 618, mobile device is permitted to attempt to access home network 106, even though limited-services timer 218 had not expired. In certain embodiments, this provides a more efficient recovery-of-services process for mobile device 102 and potentially enhances the user experience of the user of mobile device 102.

At step 63o, mobile device 102 determines whether block-list timer 220 has expired. If mobile device 102 determines at step 630 that block-list timer 220 has not expired, then block-list timer 220 may continue to run and mobile device 102 may continue at step 63o to determine whether block-list timer 220 has expired. If, on the other hand, mobile device 102 determines at step 630 that block-list timer 220 has expired, then at step 632 mobile device 102 removes visiting network 108 from the block list.

At step 634, the method ends.

Figure 7:
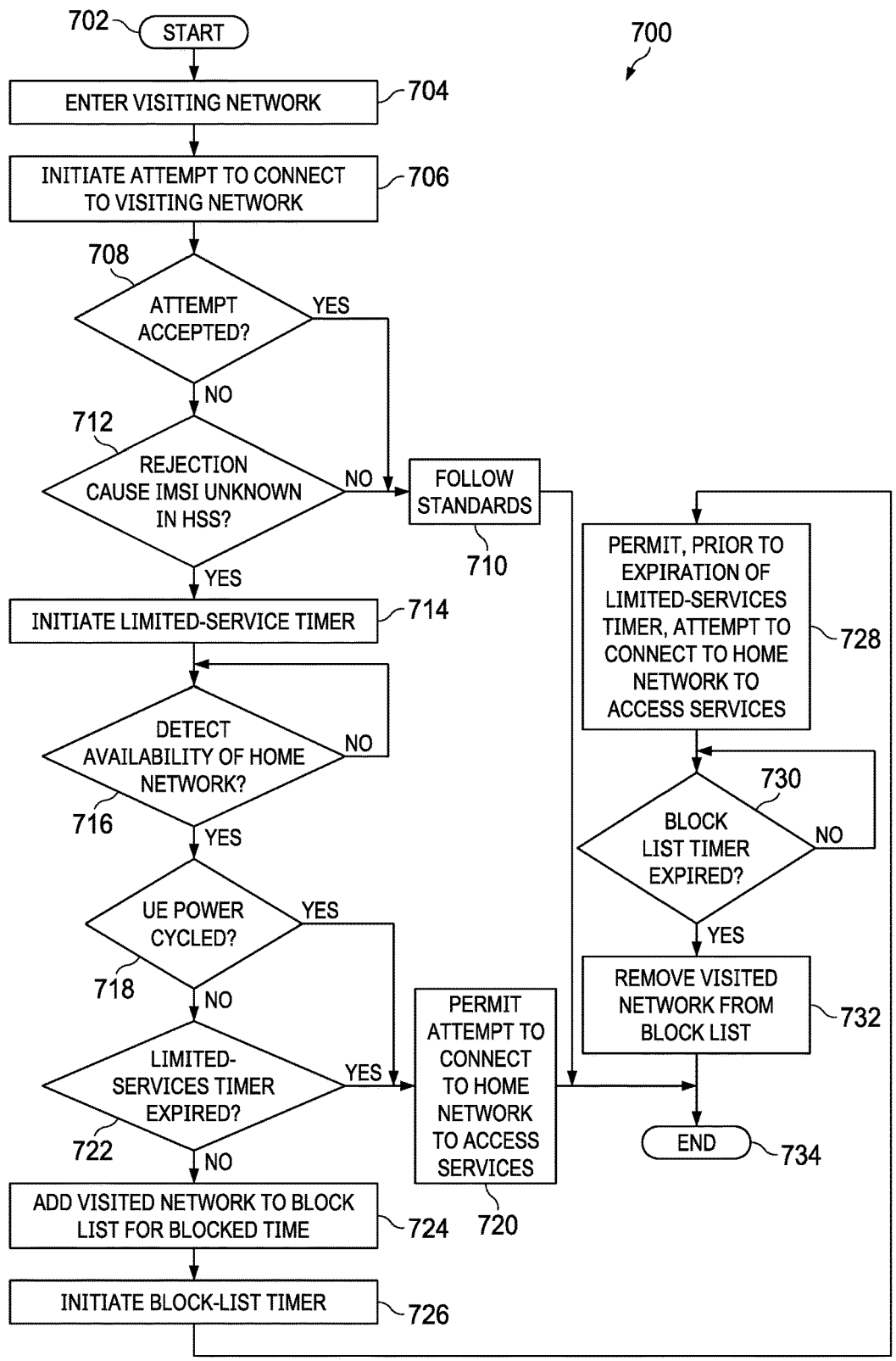
FIG. 7 illustrates an example method for restoring service on a home network of a UE in which a visiting network rejected the UE due to an unknown IMSI in HSS and in which the visiting network is added to a block list, according to certain embodiments of the present disclosure.

FIG. 7 illustrates an example method 700 for restoring service on a home network of a UE in which a visiting network rejected the UE due to an unknown IMSI in HSS and in which the visiting network is added to a block list, according to certain embodiments of the present disclosure. For purposes of example method 700, mobile device 102 is assumed to be a UE; however, one of ordinary skill in the art will appreciate that method 400 may apply to any suitable mobile device. Method 700 illustrated in FIG. 7 differs from method 500 illustrated in FIG. 5 at least in part due to the implementation in method 700 of a block list and associated block-list timer for blocking attempts to access visiting network 108.

The method begins at step 702. At step 704, mobile device 102 enters a visiting network 108. For example, mobile device 102 may move from home network 106 of mobile device 102 to visiting network 108 by changing geographical locations of mobile device 102. As another example, mobile device 102 may enter visiting network 108 by powering on from a powered down state such that mobile device 102 powers on and first attempts to access visiting network 108. As another example, mobile device 102 may enter visiting network 108 after a radio of mobile device 102 is re-enabled after having been disengaged (e.g., in a so-called "airplane mode" of mobile device 102). As yet another example, mobile device 102 may enter visiting network 108 based on any suitable combination of the foregoing or in any other suitable manner. Although this disclosure describes particular examples of mobile device 102 entering visiting network 108, this disclosure contemplates mobile device 102 entering visiting network 108 in any suitable manner.

In certain embodiments, when mobile device 102 enters visiting network 108, mobile device 102 has moved out of a coverage area 110a of home network 106, such that mobile device 102 is no longer connected to home network 106, and is now within coverage area 110b of visiting network 108.

At step 706, mobile device 102 initiates an attempt to connect to visiting network 108. For example mobile device 102 may attempt to connect to visiting network 108 via communications controller 104b. As described above, mobile device 102 may attempt to connect to visiting network 108 in any suitable manner. For example, mobile device 102 may transmit one or more of a registration request, an RAU, an LAU, and a TAU to a suitable element of visiting network 108, such as to communications controller 104b of visiting network 108. In certain embodiments, mobile device 102 may transmit any of these requests and/or updates whether in an idle or active state. Furthermore, in certain embodiments, mobile device 102 may attempt to connect to visiting network in response to mobile device 102 detecting a signal broadcast or otherwise transmitted by visiting network 108 (e.g., a signal broadcast by communications controller 104b).

At step 708, mobile device 102 determines whether the attempt to connect to visiting network 108 was accepted by visiting network 108. For example, mobile device 102 may determine whether mobile device 102 received a rejection from controller 104b of visiting network 108 or an acceptance from controller 104b of visiting network 108.

If mobile device 102 determines at step 708 that visiting network 108 accepted the attempt by mobile device 102 to connect to visiting network 108, then mobile device 102 may proceed to step 710 to follow appropriate communication standards for connecting to visiting network 108.

If, on the other hand, mobile device 102 determines at step 708 that visiting network 108 did not accept the attempt by mobile device 102 to connect to visiting network 108, then at step 712 mobile device 102 determines whether the cause of the rejection by visiting network 108 is IMSI unknown in HSS. If mobile device 102 determines at step 712 that the cause of the rejection by visiting network 108 is not IMSI unknown in HSS, then mobile device 102 may proceed to step 710 to follow appropriate communication standards. If, on the other hand, mobile device 102 determines at step 712 that the cause of the rejection by visiting network 108 is IMSI unknown in HSS, then mobile device 102 may proceed to step 714.

At step 714, mobile device 102 initiates, in response to the IMSI unknown in HSS rejection from visiting network 104, limited-services timer 218. As described above, limited-services timer 218 may initiate a limited-services state for mobile device 102. During the limited-services state, mobile device 102 may be prevented from accessing the one or more services both on visiting network 108 and on home network 106. This can create inefficiencies in the operation of mobile device 102 and an unpleasant experience for a user of mobile device 102. For example, even when mobile device 102 returns to home network 106 of mobile device 102, mobile device 102 remains unable to access services that should be available to mobile device 102 (and its associated user). While powering down and restarting mobile device 102 may reset the limited-services timer and restore services to mobile device 102, powering down and restarting mobile device 102 is inconvenient for a user of mobile device 102 and likely increases the power consumption and associated battery drain of mobile device 102.

At step 716, mobile device 102 determines whether mobile device 102 detects availability of home network 106. In certain embodiments, mobile device 102 can detect home network 106 whether mobile device 102 is in active mode or idle mode. Mobile device 102 may detect availability of home network 106 in a variety of ways. As a first example, mobile device 102 may compare information (e.g., network identifier information) received in a message (e.g., a SystemInformationBlockType1 message) communicated by communications controller 104a (e.g., an eNB) and compares that information to home network ID 214 to determine whether the network identified in the received message is home network 106 of mobile device 102. As a second example, mobile device 102 may determine that home network 106 is accessible to mobile device 102 using global positioning system (GPS) information.

Although this disclosure describes particular techniques for determining that home network 106 is accessible to mobile device 102, it should be understood that this disclosure contemplates using any suitable technique for determining that home network 106 is accessible to mobile device 102.

If mobile device 102 determines at step 716 that home network 106 is not available to mobile device 102 (e.g., if mobile device 102 does not detect home network 106), then mobile device 102 may continue to determine whether home network 106 is detected. If mobile device 102 determines at step 716 that mobile device 102 does detect home network 106, then the mobile device 102 may proceed to step 718.

At step 718, mobile device 102 determines whether a power cycle has occurred. For example, mobile device 102 may determine whether it has been powered down and restarted. In certain embodiments, if mobile device 102 determines at step 718 that mobile device 102 has been power cycled, then mobile device 102 may proceed to step 720, described below. If mobile device 102 determines at step 718 that a power cycle has not occurred, then mobile device 102 proceeds to step 722.

Although step 718 is described as mobile device 102 determining whether a power cycle has occurred, this disclosure contemplates step 718 being an explicit determination by mobile device 102 or not being an explicit determination by mobile device 102. For example, if a power cycle occurs, mobile device 102 may simply proceed to step 720 by virtue of the power cycle having occurred and without making an explicit determination that the power cycle occurred. As another example, if a power cycle does not occur, mobile device 102 may proceed to step 722 by virtue of the power cycle not having occurred and without making an explicit determination that the power cycle did not occur.

At step 720, mobile device 102 is permitted to attempt to connect to home network 106 to access services. As an example, mobile device 102 is permitted to attempt to connect to home network 106 to access at least some of, if not all of, the services to which mobile device 102 is subscribed on home network 106. The power cycling (e.g., powering down and restarting) of mobile device 102 may reset limited-services timer 218, and, when combined with mobile device 102 detecting availability of home network 106, results in mobile device 102 being permitted to attempt to connect to home network 106 to access services.

At step 722, mobile device 102 determines whether limited-services timer 218 has expired. If mobile device 102 determines at step 722 that limited-services timer 218 has expired, then mobile device 102 may proceed to step 720 at which mobile device 102 is permitted to attempt to connect to home network 106 to access services. As an example, mobile device 102 is permitted to attempt to connect to home network 106 to access at least some of, if not all of, the services to which mobile device 102 is subscribed on home network 106. The expiration of limited-services timer 218, when combined with mobile device 102 detecting availability of home network 106, results in mobile device 102 being permitted to attempt to connect to home network 106 to access services. If mobile device 102 determines at step 622 that limited-services timer 218 has not expired, then mobile device 102 proceeds to step 724.

At step 724, mobile device 102 adds visiting network 108 to a block list for a blocked time. Mobile device 102 may forego attempting to connect to networks that are included on the block list for the blocked time. Because, in response to mobile device 102 detecting availability of home network 106 and determining that limited-services timer has not expired, mobile device may ignore or reset limited-services timer 218 (as described below with reference to step 728), it is possible that mobile device 102 may again detect visiting network 108 and attempt to connect to visiting network 108. This may be particularly possible when coverage area 110*a* of home network 106 and coverage area 110*b* of visiting network 108 overlap or are otherwise in relatively close proximity to one another. As a particular example, this may be particularly possible when a mobile device 102 moves around in area 114 shown in FIG. 1C.

These repeated attempts by mobile device 102 to access visiting network 108 could result in a waste of processing and network resources for both mobile device 102 and elements of visiting network 108. Visiting network 108 likely would again reject mobile device 102 for the same reasons, and both visiting network 108 and mobile device 102 would have to waste processing and network resources to again determine that mobile device 102 is rejected. In certain embodiments, adding a visiting network 108 that rejected mobile device 102 to a block list for a blocked time may reduce or eliminate instances of mobile device 102 repeatedly attempting to access visiting network 108, which may save processing and/or network resources of mobile device 102 and visiting network 108.

At step 726, mobile device 102 initiates a block-list timer 220 corresponding to visiting network 108 to begin the blocked time. The blocked time measured by block-list timer 220 may have any suitable value, according to particular needs.

At step 728, mobile device 102 is permitted, prior to the expiration of limited-services timer 218, to attempt to connect to home network 106 to access services. As an example, mobile device 102 is permitted to attempt to connect to home network 106 to access at least some of, if not all of, the services to which mobile device 102 is subscribed on home network 106. Such services may include services that mobile device 102 was prevented from accessing in the limited service state, even on home network 106 of mobile device 102. In certain embodiments, to restore the ability to attempt to connect to home network 106 to access those services, mobile device may be configured to ignore the limited service timer (and allow the limited service timer to expire in the background) or to reset the limited-services timer such that the limited service timer no longer is running and/or is reset to zero.

In certain embodiments, because mobile device 102 detected availability of home network 106 (at step 716) and without an inconvenient power cycling of mobile device 102 at step 718, mobile device is permitted to attempt to access home network 106, even though limited-services timer 218 had not expired. In certain embodiments, this provides a more efficient recovery-of-services process for mobile device 102 and potentially enhances the user experience of the user of mobile device 102.

At step 730, mobile device 102 determines whether block-list timer 220 has expired. If mobile device 102 determines at step 730 that block-list timer 220 has not expired, then block-list timer 220 may continue to run and mobile device 102 may continue at step 730 to determine whether block-list timer 220 has expired. If, on the other hand, mobile device 102 determines at step 730 that block-list timer 220 has expired, then at step 732 mobile device 102 removes visiting network 108 from the block list.

At step 734, the method ends.

Although the types of rejections communicated by visiting network 108 that trigger initiation of limited-services timer 218 by mobile device 102 are described in separate figures, this disclosure contemplates mobile device 102 determining whether the rejection is one of multiple different types of rejections (and, if so, initiating limited-services timer 218) as part of a single operational flow. As just one example, mobile device 102 could, as part of a single operational flow, determine whether the rejection received from visiting network 108 is illegal UE or IMSI unknown in HSS (or any other suitable type of rejection) and, if appropriate, initiate limited-services timer 218. Furthermore, in such a combined operational flow, the present disclosure also contemplates adding visiting network 108 to a block list and initiating a block-list timer 220, if appropriate. Thus, this disclosure contemplates the operations described with respect to FIGS. 4-7 being combined in any suitable manner, according to particular needs.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

Figure 8:
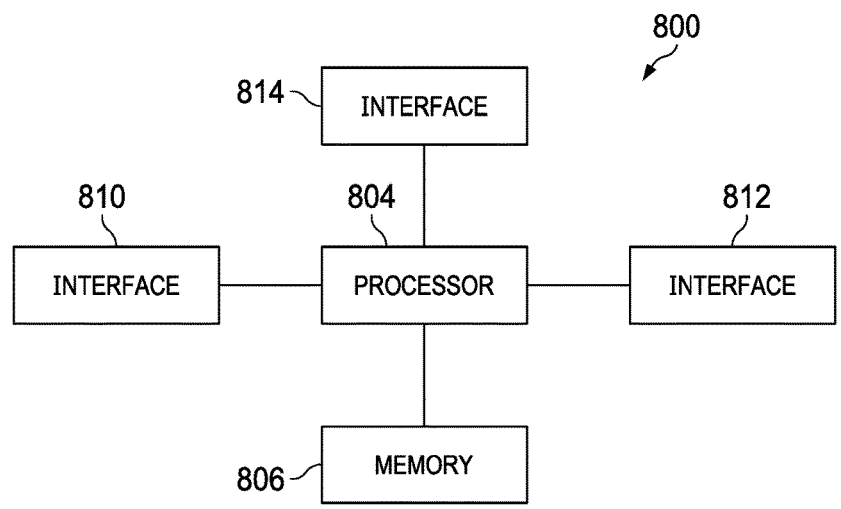
FIG. 8 illustrates a block diagram of an example processing system, according to certain embodiments of the present disclosure.

FIG. 8 illustrates a block diagram of an example processing system 800, according to certain embodiments of the present disclosure. Processing system 800 may be configured to perform methods described in this disclosure, and may be installed in a host device. As shown, processing system 800 includes a processor 804, a memory 806, and interfaces 810-814, which may (or may not) be arranged as shown in FIG. 8. Processor 804 may be any component or collection of components adapted to perform computations and/or other processing related tasks, and the memory 806 may be any component or collection of components adapted to store programming and/or instructions for execution by processor 804. In an embodiment, memory 806 includes a non-transitory computer readable medium. The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

In some embodiments, processing system 800 is included in a network device that is accessing, or part otherwise of, a telecommunications network. In one example, processing system 600 is in a network-side device in a wireless or wireline telecommunications network, such as a base station, a relay station, a scheduler, a controller, a gateway, a router, an applications server, or any other device in the telecommunications network. In other embodiments, processing system 80o is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 9:
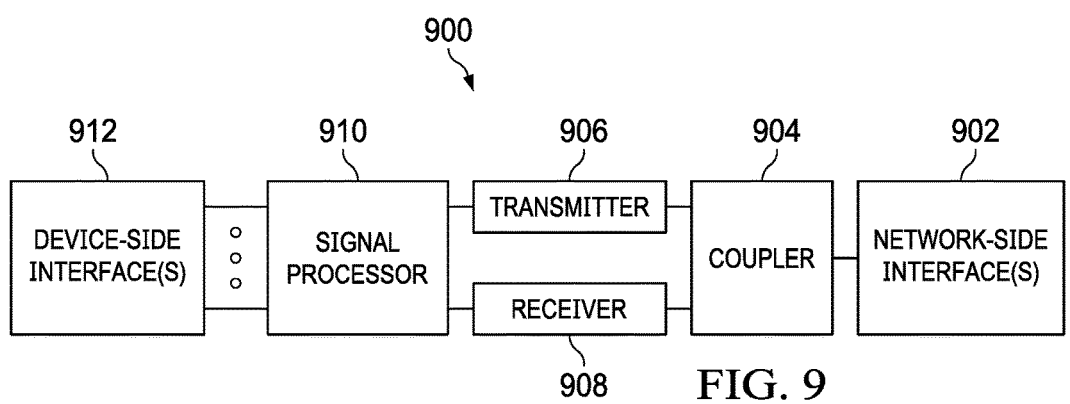
FIG. 9 illustrates a block diagram of an example transceiver 900, according to certain embodiments of the present disclosure.

FIG. 9 illustrates a block diagram of an example transceiver 900, according to certain embodiments of the present disclosure. Transceiver 900 is adapted to transmit and receive signals over a telecommunication network. In some embodiments, one or more of interfaces 810, 812, 814 shown in and described with reference to FIG. 8 connects processing system 800 to a transceiver (e.g., transceiver 900) adapted to transmit and receive signaling over the telecommunications network. The transceiver 900 may be installed in a host device. As shown, transceiver 900 comprises a network-side interface 902, a coupler 904, a transmitter 906, a receiver 908, a signal processor 910, and a device-side interface 912. Network-side interface 902 may include any component or collection of components adapted to transmit or receive signaling over a wireless or wireline telecommunications network. Coupler 904 may include any component or collection of components adapted to facilitate bi-directional communication over network-side interface 902. Transmitter 906 may include any component or collection of components (e.g., up-converter, power amplifier, etc.) adapted to convert a baseband signal into a modulated carrier signal suitable for transmission over network-side interface 902. Receiver 908 may include any component or collection of components (e.g., down-converter, low noise amplifier, etc.) adapted to convert a carrier signal received over network-side interface 902 into a baseband signal. Signal processor 910 may include any component or collection of components adapted to convert a baseband signal into a data signal suitable for communication over device-side interface(s) 912, or vice-versa. Device-side interface(s) 912 may include any component or collection of components adapted to communicate data-signals between signal processor 910 and components within the host device (e.g., processing system 800, local area network (LAN) ports, etc.).

Transceiver 90o may transmit and receive signaling over any type of communications medium. In some embodiments, transceiver 900 transmits and receives signaling over a wireless medium. For example, transceiver 900 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, network-side interface 902 comprises one or more antenna/radiating elements. For example, network-side interface 902 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 900 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A mobile device, comprising:
   one or more processors; and
   a non-transitory computer-readable medium storing instructions, the instructions configured to, when executed by the one or more processors, cause the one or more processors to perform operations comprising:
   initiating an attempt to connect to a visiting network;
   receiving, in response to the attempt to connect to the visiting network, a rejection from the visiting network;
   initiating, in response to the rejection from the visiting network, a limited-services timer to initiate a limited-services state for the mobile device, the mobile device being subscribed to a service on a home network of the mobile device, the mobile device being prevented in the limited-services state from attempting to access the service;
   detecting, prior to expiration of the limited-services timer, availability of the home network of the mobile device; and permitting, prior to expiration of the limited-service timer, the mobile device to attempt to connect to the home network for accessing the service.

2. The mobile device of claim 1, wherein initiating the attempt to connect to the visiting network comprises initiating communication of a registration request from the mobile device to the visiting network.

3. The mobile device of claim 1, wherein initiating the attempt to connect to the visiting network comprises initiating communication of one or more of a routing area update (RAU), a location area update (LAU), and a tracking area update (TAU) from the mobile device to the visiting network.

4. The mobile device of claim 1, wherein a starting time of the limited-services timer is randomly selected from a range of twelve to twenty-four hours.

5. The mobile device of claim 1, wherein the home network is a home public land mobile network and the visiting network is a visiting public land mobile network.

6. The mobile device of claim 1, wherein:
the rejection comprises an illegal user equipment (UE) evolved packet system (EPS) mobility management (EMM) message; and
the mobile device being prevented in the limited-services state from attempting to access the service comprises preventing the mobile device from making voice calls other than emergency calls.

7. The mobile device of claim 1, wherein:
the rejection comprises an international mobile subscriber identity (IMSI) unknown in home subscriber server (HSS) evolved packet system (EPS) mobility management (EMM) message; and
the mobile device being prevented in the limited-services state from attempting to access the service comprises preventing the mobile device from communicating via a first type of network but allowing the mobile device to communicate via a second type of network.

8. The mobile device of claim 1, wherein permitting, prior to expiration of the limited-service timer, the mobile device to attempt to connect to the home network comprises resetting the limited-service timer to zero.

9. The mobile device of claim 1, wherein, in the limited-services state the mobile device is prevented from making calls other than calls for emergency services.

10. The mobile device of claim 1, wherein detecting availability of the home network of the mobile device comprises receiving a SystemInformationBlockType1 ($SIM_1$) message from an access point of the home network.

11. The mobile device of claim 1, wherein:
the mobile device is subscribed to a plurality of services on the home network of the mobile device, the plurality of services comprising the service; and
permitting, prior to expiration of the limited-service timer, the mobile device to attempt to connect to the home network to access the service comprises permitting the mobile device to attempt to connect to the home network to access the plurality of services.

12. The mobile device of claim 1, wherein the operations further comprise, prior to expiration of the limited-services timer and based at least in part on detecting the home network:
adding the visiting network to a block list, the block list being a list of networks that the mobile device with which the mobile device is prevented from attempting to connect; and initiating a block-list timer corresponding to the visiting network and for keeping the visiting network on the block list.

13. A method, comprising:
initiating, by a mobile device, an attempt to connect to a visiting network;
receiving, by the mobile device in response to the attempt to connect to the visiting network, a rejection from the visiting network;
initiating, by the mobile device in response to the rejection from the visiting network, a limited-services timer to initiate a limited-services state for the mobile device, the mobile device being subscribed to a service on a home network of the mobile device, the mobile device being prevented in the limited-services state from attempting to access the service;
detecting, by the mobile device prior to expiration of the limited-services timer, availability of the home network of the mobile device; and
permitting, by the mobile device prior to expiration of the limited-service timer, the mobile device to attempt to connect to the home network for accessing the service.

14. The method of claim 13, wherein initiating the attempt to connect to the visiting network comprises initiating communication of a registration request from the mobile device to the visiting network.

15. The method of claim 13, wherein initiating the attempt to connect to the visiting network comprises initiating communication of one or more of a routing area update (RAU), a location area update (LAU), and a tracking area update (TAU) from the mobile device to the visiting network.

16. The method of claim 13, wherein a starting time of the limited-services timer is randomly selected from a range of twelve to twenty-four hours.

17. The method of claim 13, wherein the home network is a home public land mobile network and the visiting network is a visiting public land mobile network.

18. The method of claim 13, wherein:
the rejection comprises an illegal user equipment (UE) evolved packet system (EPS) mobility management (EMM) message; and
the mobile device being prevented in the limited-services state from attempting to access the service comprises preventing the mobile device from making voice calls other than emergency calls.

19. The method of claim 13, wherein:
the rejection comprises an international mobile subscriber identity (IMSI) unknown in home subscriber server (HSS) evolved packet system (EPS) mobility management (EMM) message; and
the mobile device being prevented in the limited-services state from attempting to access the service comprises preventing the mobile device from communicating via a first type of network but allowing the mobile device to communicate via a second type of network.

20. The method of claim 13, wherein permitting, prior to expiration of the limited-service timer, the mobile device to attempt to connect to the home network comprises resetting the limited-service timer to zero.

21. The method of claim 13, wherein, in the limited-services state the mobile device is prevented from making calls other than calls for emergency services.

22. The method of claim 13, wherein detecting availability of the home network of the mobile device comprises receiving a SystemInformationBlockType1 ($SIB_1$) message from an access point of the home network.

23. The method of claim 13, wherein:
the mobile device is subscribed to a plurality of services on the home network of the mobile device, the plurality of services comprising the service; and
permitting, prior to expiration of the limited-service timer, the mobile device to attempt to connect to the home network to access the service comprises permitting the mobile device to attempt to connect to the home network to access the plurality of services.

24. The method of claim 13, further comprising, prior to expiration of the limited-services timer and based at least in part on detecting the home network:
adding the visiting network to a block list, the block list being a list of networks that the mobile device with which the mobile device is prevented from attempting to connect; and
initiating a block-list timer corresponding to the visiting network and for keeping the visiting network on the block list.

25. A non-transitory computer-readable medium storing instructions, the instructions configured to, when executed by one or more processors, cause the one or more processors to perform operations comprising:
initiating, by a mobile device, an attempt to connect to a visiting network, the attempt to connect to the visiting network comprising one or more of a registration request, a routing area update (RAU), a location area update (LAU), and a tracking area update (TAU);
receiving, by the mobile device in response to the attempt to connect to the visiting network, a rejection from the visiting network, the rejection being one or more of an illegal user equipment (UE) evolved packet system (EPS) mobility management (EMM) message and an international mobile subscriber identity (IMSI) unknown in home subscriber server (HSS) EMM message;
initiating, by the mobile device in response to the rejection from the visiting network, a limited-services timer to initiate a limited-services state for the mobile device, the mobile device being subscribed to a service on a home network of the mobile device, the mobile device being prevented in the limited-services state from attempting to access the service both on the home network and the visiting network;
detecting, by the mobile device prior to expiration of the limited-services timer and without the mobile device being power-cycled after initiation of the limited-services timer, availability of the home network of the mobile device; and
permitting, by the mobile device prior to expiration of the limited-service timer and without the mobile device being power-cycled after initiation of the limited-services timer, the mobile device to attempt to connect to the home network for accessing the service.

* * * * *

UNITED STATES PATENT AND TRADEMARK OFFICE
CERTIFICATE OF CORRECTION

PATENT NO. : 10,271,298 B1  
APPLICATION NO. : 16/022012  
DATED : April 23, 2019  
INVENTOR(S) : Yang et al.

Page 1 of 1

It is certified that error appears in the above-identified patent and that said Letters Patent is hereby corrected as shown below:

In the Claims

In Column 33, Line 50, Claim 10, delete "($SIM_1$)" and insert --($SIB1$)--.

In Column 34, Line 66, Claim 22, delete "($SIB_1$)" and insert --($SIB1$)--.

Signed and Sealed this  
Fifteenth Day of October, 2019

Andrei Iancu  
*Director of the United States Patent and Trademark Office*